(12) United States Patent
Zhao

(10) Patent No.: US 11,930,268 B2
(45) Date of Patent: Mar. 12, 2024

(54) SHOOTING METHOD AND TERMINAL DEVICE

(71) Applicant: VIVO MOBILE COMMUNICATION CO., LTD., Guangdong (CN)

(72) Inventor: Yufei Zhao, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 252 days.

(21) Appl. No.: 17/388,409

(22) Filed: Jul. 29, 2021

(65) Prior Publication Data
US 2021/0360168 A1 Nov. 18, 2021

Related U.S. Application Data

(63) Continuation of application No. PCT/CN2020/073893, filed on Jan. 22, 2020.

(30) Foreign Application Priority Data

Jan. 31, 2019 (CN) .......................... 201910101415.0

(51) Int. Cl.
*H04N 23/63* (2023.01)
*H04N 5/265* (2006.01)

(52) U.S. Cl.
CPC ........... *H04N 23/632* (2023.01); *H04N 5/265* (2013.01)

(58) Field of Classification Search
CPC ...... H04N 23/632; H04N 5/265; H04N 23/62; H04N 23/698; H04N 5/2621; G06F 3/0488
See application file for complete search history.

(56) References Cited

U.S. PATENT DOCUMENTS

| | | | | |
|---|---|---|---|---|
| 6,657,667 B1 * | 12/2003 | Anderson | .............. | H04N 5/262 348/333.12 |
| 8,111,314 B2 * | 2/2012 | Lee | .................... | H04N 1/00453 348/207.99 |
| 8,593,555 B1 * | 11/2013 | Chun | ................... | H04N 23/631 348/333.01 |

(Continued)

FOREIGN PATENT DOCUMENTS

| | | | |
|---|---|---|---|
| CN | 101742048 A | 6/2010 | |
| CN | 103491298 A | 1/2014 | |

(Continued)

OTHER PUBLICATIONS

Supplementary European Search Report regarding Patent Application No. 20749633.2-1208/3920523; PCT/CN2020/073893, dated Mar. 1, 2022.

(Continued)

*Primary Examiner* — Timothy J Henn
(74) *Attorney, Agent, or Firm* — Harness, Dickey & Pierce, P.L.C.

(57) ABSTRACT

A shooting method includes: receiving N inputs performed by a user on a preset marquee; and updating a display position of the marquee and sequentially shooting N target images in response to the N inputs. The target image is an image of a target area on a shooting preview interface, and the target area is a whole area of the shooting preview interface or an area selected by the marquee; and N is a positive integer.

18 Claims, 14 Drawing Sheets

(56) References Cited

U.S. PATENT DOCUMENTS

| | | | |
|---|---|---|---|
| 2003/0058255 A1* | 3/2003 | Yamagishi | H04N 1/00244 345/619 |
| 2007/0263071 A1 | 11/2007 | Lee et al. | |
| 2014/0092292 A1 | 4/2014 | Kuznetsov | |
| 2014/0146212 A1 | 5/2014 | Jung et al. | |
| 2014/0313389 A1 | 10/2014 | Kim et al. | |
| 2021/0014413 A1 | 1/2021 | Yang | |

FOREIGN PATENT DOCUMENTS

| | | |
|---|---|---|
| CN | 104333695 A | 2/2015 |
| CN | 104618572 A | 5/2015 |
| CN | 105162978 A | 12/2015 |
| CN | 106572295 A | 4/2017 |
| CN | 107872623 A | 4/2018 |
| CN | 108174081 A | 6/2018 |
| CN | 108495029 A | 9/2018 |
| CN | 109862267 A | 6/2019 |
| JP | 2011010150 A | 1/2011 |
| WO | WO-2012105768 A2 | 8/2012 |

OTHER PUBLICATIONS

International Search Report and Written Opinion of the International Searching Authority regarding International Patent Application No. PCT/CN2020/073893, dated Mar. 10, 2020. Translation provided by Bohui Intellectual Property.

First Office Action regarding Chinese Patent Application No. 201910101415.0, dated Apr. 26, 2020. Translation provided by Bohui Intellectual Property.

* cited by examiner

US 11,930,268 B2

SHOOTING METHOD AND TERMINAL DEVICE

CROSS-REFERENCE TO RELATED APPLICATIONS

This application is a Bypass Continuation Application of PCT/CN2020/073893, filed on Jan. 22, 2020, which claims priority to Chinese Patent Application No. 201910101415.0, filed on Jan. 31, 2019, which are incorporated herein by reference in their entirety.

TECHNICAL FIELD

Embodiments of the present invention relate to the field of communications technologies, and in particular, to a shooting method and a terminal device.

BACKGROUND

As an application scope of a terminal device becomes wider, a user may use the terminal device to perform shooting to obtain photos, and perform stitching processing on the photos as required.

SUMMARY

Embodiments of the present disclosure provide a shooting method and a terminal device.

According to a first aspect, an embodiment of the present disclosure provides a shooting method, applied to a terminal device. The method includes: receiving N inputs performed by a user on a preset marquee; and updating a display position of the marquee and sequentially shooting N target images in response to the N inputs, where the target image is an image of a target area on a shooting preview interface, and the target area is a whole area of the shooting preview interface or an area selected by the marquee; and N is a positive integer.

According to a second aspect, an embodiment of the present disclosure provides a terminal device. The terminal device includes a receiving module and a processing module. The receiving module is configured to receive N inputs performed by a user on a preset marquee. The processing module is configured to update a display position of the marquee and sequentially shoot N target images in response to the N inputs received by the receiving module. The target image is an image of a target area on a shooting preview interface, and the target area is a whole area of the shooting preview interface or an area selected by the marquee; and N is a positive integer.

According to a third aspect, an embodiment of the present disclosure provides a terminal device. The terminal device includes a processor, a memory, and a computer program that is stored in the memory and executable on the processor, and when the computer program is executed by the processor, the steps of the shooting method in the first aspect are implemented.

According to a fourth aspect, an embodiment of the present disclosure provides a non-transitory computer-readable storage medium. The non-transitory computer-readable storage medium stores a computer program, and when the computer program is executed by a processor, the steps of the shooting method in the first aspect are implemented.

DESCRIPTION OF EMBODIMENTS

Figure 1:
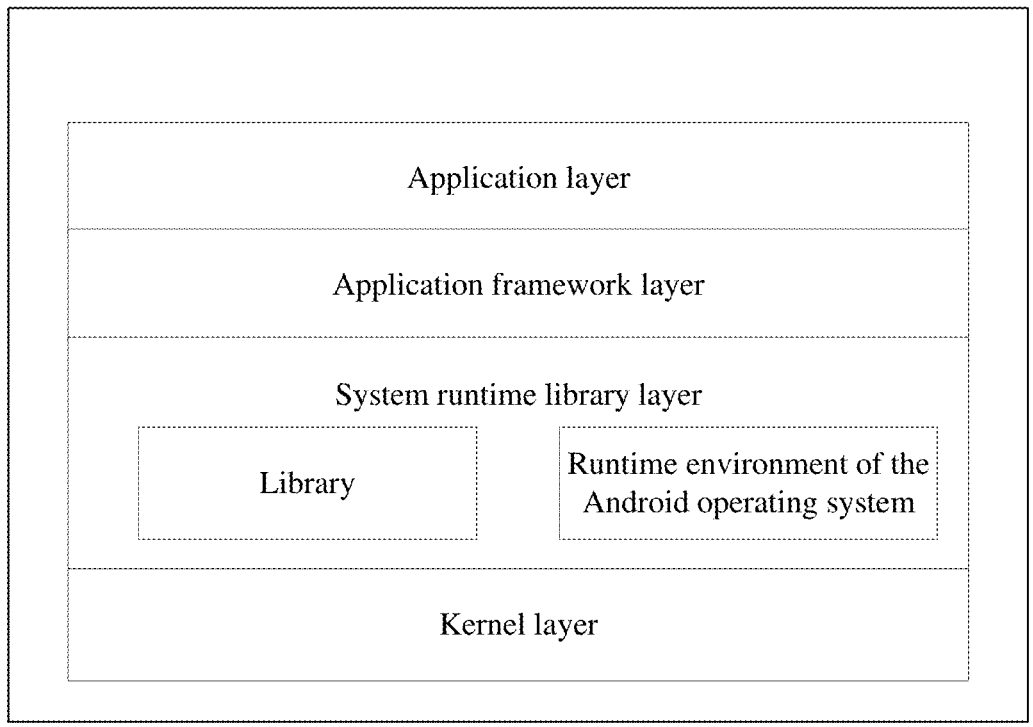
FIG. 1 is a schematic architectural diagram of a possible Android operating system according to an embodiment of the present disclosure.

The following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure shall fall within the protection scope of the present disclosure.

The term "and/or" in this specification describes an association relationship of associated objects, indicating that three relationships may exist. For example, A and/or B may indicate three cases: Only A exists, both A and B exist, and only B exists. A character "/" in this specification indicates an "or" relationship between associated objects. For example, A/B indicates A or B.

In the specification and claims of the present disclosure, the terms such as "first" and "second" are used to distinguish between different objects, but are not used to describe a particular sequence of the objects. For example, a first input and a second input are intended to distinguish between different inputs, instead of describing a particular order of the inputs.

In the embodiments of the present disclosure, the word such as "example" or "for example" is used to represent giving an example, an illustration, or a description. Any embodiment or design scheme described as an "example" or "for example" in the embodiments of the present disclosure should not be explained as being more preferred or having more advantages than another embodiment or design scheme. Exactly, use of the term "example" or "for example" is intended to present a concept in a specific manner.

In the descriptions of the embodiments of the present disclosure, unless otherwise stated, "a plurality of" means two or more, for example, "a plurality of" processing units means two or more processing units.

Embodiments of the present disclosure provide a shooting method and a terminal device. N inputs performed by a user on a preset marquee may be received; and a display position of the marquee is updated and N target images are sequentially shot in response to the N inputs, where the target image is an image of a target area on a shooting preview interface, and the target area is a whole area of the shooting preview interface or an area selected by the marquee; and N is a positive integer. According to the solutions, in the embodiments of the present disclosure, when a plurality of images are continuously shot, the plurality of images obtained through shooting may be sequentially displayed or arranged on a current display screen, so that image stitching can be further performed on the plurality of images obtained through shooting on a current display screen, without a need to use photo processing software to splice photos obtained through shooting after the photos are shot. In this way, in the embodiments of the present disclosure, efficiency of shooting and stitching photos by the terminal device can be improved.

The terminal device provided in the embodiments of the present disclosure may be a terminal device with an operating system. The operating system may be an Android operating system, or may be an iOS operating system or other possible operating systems, which is not specifically limited in the embodiments of the present disclosure.

The following uses the Android operating system as an example to describe a software environment to which the shooting method provided in the embodiments of the present disclosure is applied.

FIG. 1 is a schematic architectural diagram of a possible Android operating system according to an embodiment of the present disclosure. In FIG. 1, the architecture of the Android operating system includes 4 layers, namely: an application layer, an application framework layer, a system runtime library layer, and a kernel layer (optionally, it may be the Linux kernel layer).

The application layer includes various applications in the Android operating system (including system applications and third-party applications).

The application framework layer is the framework of applications. Developers can develop some applications based on the application framework layer while complying with the development principle of the application framework.

The system runtime library layer includes a library (also called a system library) and a runtime environment of the Android operating system. The library mainly provides various resources needed by the Android operating system. The runtime environment of the Android operating system is used to provide a software environment for the Android operating system.

The kernel layer is the operating system layer of the Android operating system and belongs to the lowest layer of software hierarchy of the Android operating system. The kernel layer provides core system services and hardware-related drivers for the Android operating system based on the Linux kernel.

The Android operating system is used as an example. In the embodiments of the present invention, a developer may develop, based on the system architecture of the Android operating system shown in FIG. 1, a software program to implement the shooting method provided in the embodiments of the present invention, so that the shooting method can run based on the Android operating system shown in FIG. 1. That is, a processor or the terminal device may run the software program in the Android operating system to implement the shooting method provided in this embodiment of the present disclosure.

The terminal device in the embodiments of the present disclosure may be a mobile terminal, or may be a non-mobile terminal. For example, the mobile terminal may be a mobile phone, a tablet computer, a laptop computer, a palmtop computer, an in-vehicle terminal, a wearable device, a ultra-mobile personal computer (UMPC), a netbook, or a personal digital assistant (PDA). The non-mobile terminal may be a personal computer (PC), a television (TV), an automated teller machine or a self-service machine. This is not specifically limited in the embodiments of the present disclosure.

The shooting method provided in the embodiments of the present disclosure may be performed by the foregoing terminal device, or a functional module and/or a functional entity that can implement the shooting method in the terminal device. Optionally, this may be determined based on an actual use requirement, and is not limited in the embodiments of the present disclosure. Taking the terminal device as an example, the following describes the shooting method provided in the embodiments of the present disclosure.

The user may trigger the terminal device to perform shooting to obtain a plurality of photos, trigger the terminal device to run third-party software (such as photo processing software) installed on the terminal device, then trigger the terminal device to import the plurality of photos into the third-party software, and finally trigger the terminal device to splice the plurality of photos into one image for saving and/or sharing. However, in the foregoing shooting method, a plurality of times of shooting need to be completed to obtain a plurality of photos, and then the plurality of photos obtained through shooting are spliced by using the third-party software. Therefore, a process from shooting to completing stitching is cumbersome and takes a relatively long time, resulting in relatively low efficiency of photo processing by the terminal device when the terminal device shoots a plurality of photos in succession.

Figure 2:
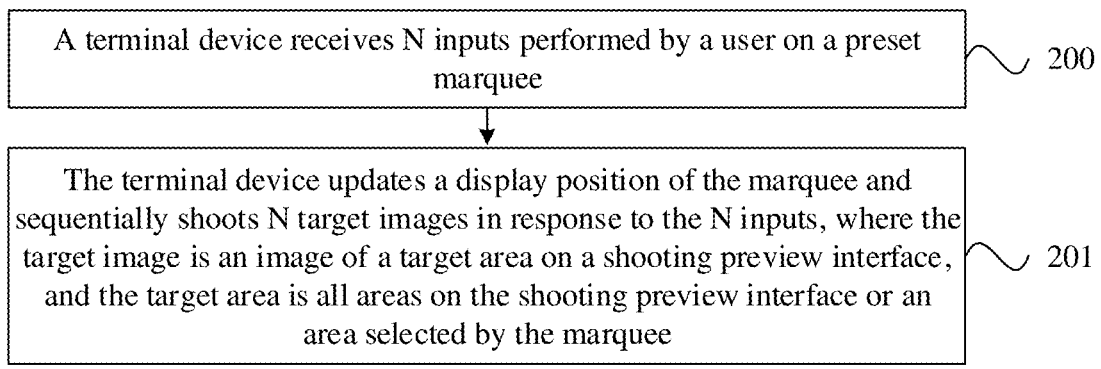
FIG. 2 is a schematic diagram 1 of a shooting method according to an embodiment of the present disclosure.

As shown in FIG. 2, an embodiment of the present disclosure provides a shooting method. The shooting method may include the following steps 200 and step 201.

Step 200: A terminal device receives N inputs performed by a user on a preset marquee.

N may be a positive integer.

Figure 3:
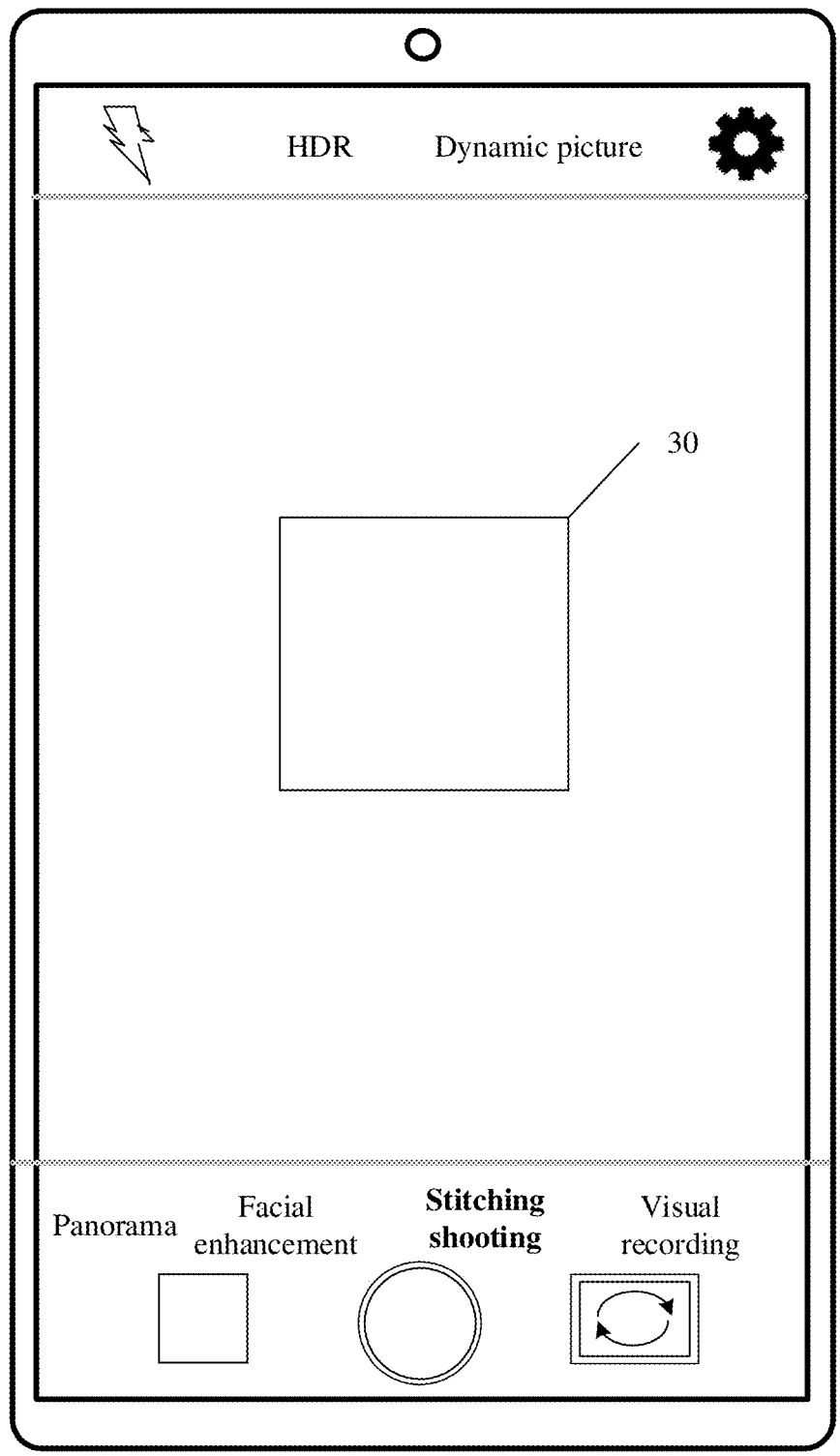
FIG. 3 is a schematic diagram 1 of an application interface of a shooting method according to an embodiment of the present disclosure.

In this embodiment of the present disclosure, referring to FIG. 3, if the user needs to continuously shoot at least one photo, the user may trigger the terminal device to run a camera application, and then in a specific shooting mode of the camera (for example, a "stitching shooting mode" shown in FIG. 3), the user may select a marquee (a marquee 30 in FIG. 3) displayed on a display screen of the terminal device, to trigger the terminal device to update a display position of the marquee to shoot a photo, and display the current shot photo in an area in which the marquee on the display screen is located.

Optionally, in this embodiment of the present disclosure, each of the N inputs performed by the user may be a drag input, or may be a drag input and a click input (for example, a single-click input or a double-click input), or may be an input in any other possible form. Optionally, this may be determined based on an actual use requirement, and is not limited in this embodiment of the present disclosure.

For example, an example in which each of the N inputs is a drag input is used for description. Each input performed by the user on the preset marquee is an input in which the user drags the preset marquee from one position to another position.

For example, an example in which each of the N inputs is a drag sub-input and a click sub-input is used for description. Each input performed by the user on the preset marquee is an input in which the user drags the preset marquee from one position to another position, and then clicks the preset marquee.

Optionally, in this embodiment of the present disclosure, in a shooting process, an image that is the same as an image in a shooting preview interface of the terminal device may be displayed in the preset marquee in real time, that is, the image in the marquee and the image in the shooting preview interface may synchronously change. In addition, after obtaining a target image through shooting, the terminal device may fixedly display the target image in an area in which the marquee is located. Optionally, this may be determined based on an actual use requirement, and is not limited in this embodiment of the present disclosure.

Optionally, the preset marquee and the shooting preview interface may be displayed on a same display screen of the terminal device. For example, the preset marquee may be displayed on the shooting preview interface in a hovering manner. Alternatively, the preset marquee and the shooting preview interface may be separately displayed on different display screens of the terminal device. This may be specifically determined based on an actual use requirement, and is not limited in this embodiment of the present disclosure.

Figure 4:
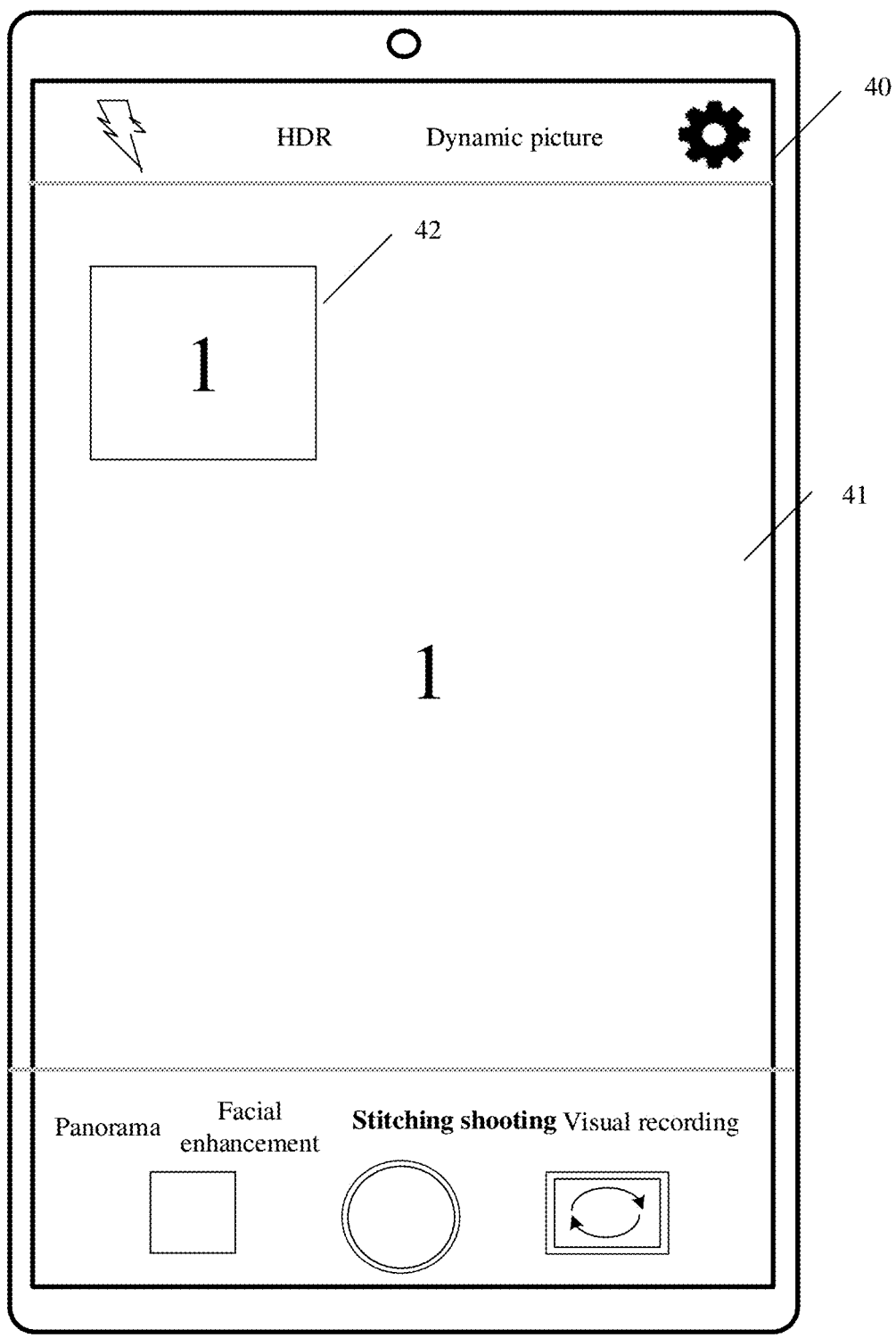
FIG. 4 is a schematic diagram 2 of an application interface of a shooting method according to an embodiment of the present disclosure.

Referring to FIG. 4, the following describes a possible implementation of step 200 by using an example in which the marquee and the shooting preview interface are displayed on a same display screen.

As shown in FIG. 4, the terminal device may display a shooting preview interface 41 and a marquee 42 on a display screen 40, where the marquee 42 is a rectangular box, and an image "1" displayed in the marquee 42 is the same as a preview image "1" displayed on the shooting preview interface 41. The user may perform a drag input on the marquee 42 displayed on the shooting preview interface 41t, to trigger the terminal device to update a display position of the marquee 42 on the shooting preview interface 41.

Figure 5:
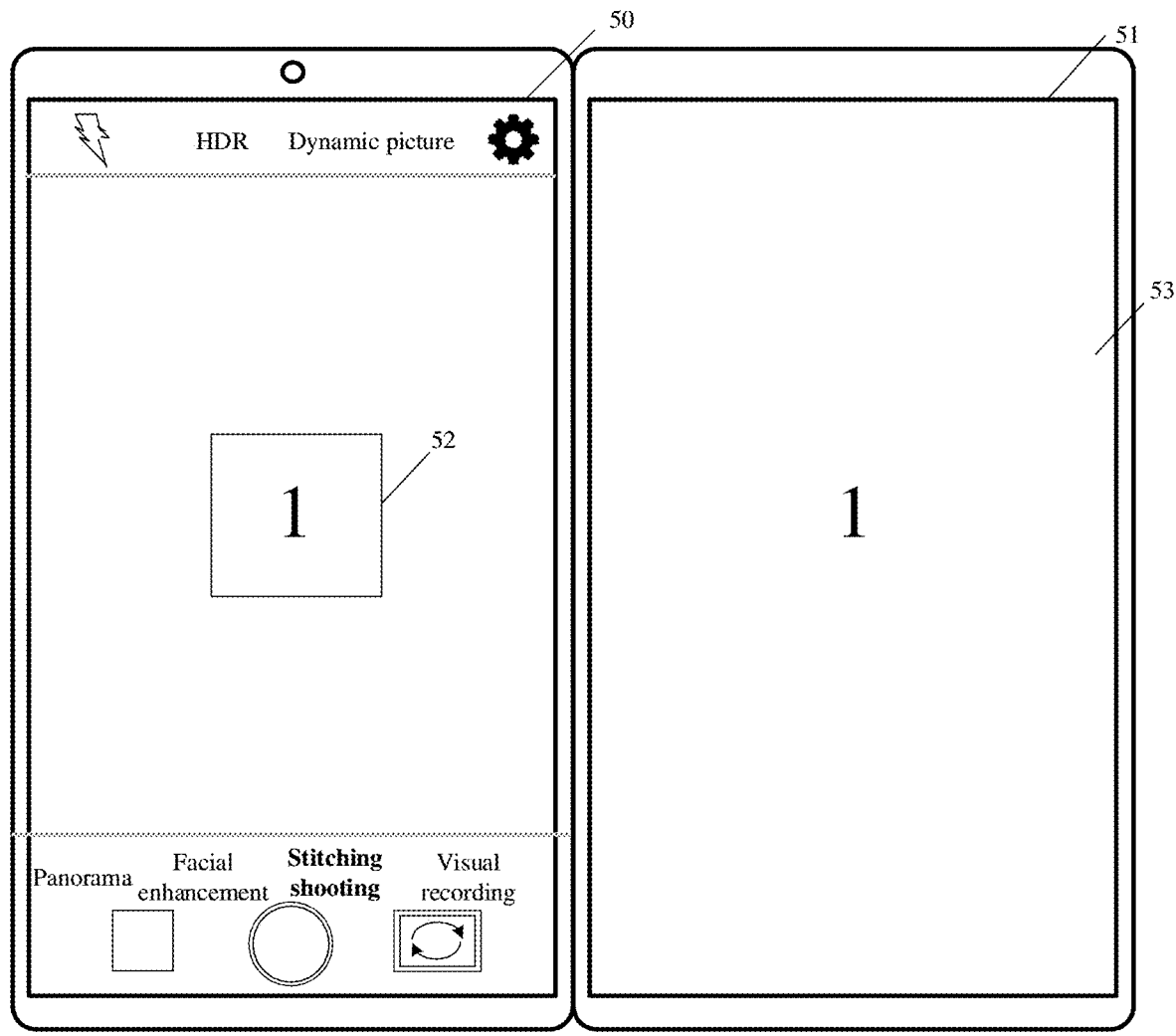
FIG. 5 is a schematic diagram 3 of an application interface of a shooting method according to an embodiment of the present disclosure.

Referring to FIG. 5, the following describes a possible implementation of step 200 by using an example in which the marquee and the shooting preview interface are separately displayed on different display screens.

As shown in FIG. 5, the terminal device includes a first screen 50 and a second screen 51. The first screen 50 may display a preset marquee 52, and the second screen 51 may display a shooting preview interface 53, where the marquee 52 is a rectangular box, and an image "1" displayed in the marquee 52 is the same as a preview image "1" displayed on the shooting preview interface 53. The user may perform a drag input on the marquee 52 to trigger the terminal device to update a display position of the marquee 52 on the first screen 50.

Optionally, in this embodiment of the present disclosure, the marquee may be superposed on a display screen with first transparency. Alternatively, an image displayed in the marquee may be superposed on a display screen with first transparency. For example, if the first transparency is recorded as T1, a value range of T1 may be greater than 0%, and less than 100%. It should be noted that, in a case that T1 is equal to 100%, a display state of the image displayed in the marquee is adjusted to a transparent state.

Optionally, in this embodiment of the present disclosure, a shape of the preset marquee may be a rectangle, may be a circle, or may be any other possible shape. This may be determined based on an actual use requirement, and is not limited in this embodiment of the present disclosure.

Step 201: The terminal device updates a display position of the marquee and sequentially shoots N target images in response to the N inputs, where the target image is an image of a target area on a shooting preview interface, and the target area is a whole area of the shooting preview interface or an area selected by the marquee.

For example, an example in which the N inputs are a drag sub-input and a click sub-input is used for description. The terminal device may display the marquee in an area corresponding to an end position of the drag sub-input on the display screen in response to the drag sub-input. In addition, the terminal device may display the target image in an area in which the marquee is located in response to the click sub-input.

Optionally, in response to the first input performed by the user on the marquee (that is, a drag sub-input and a click sub-input, where i is 1 in this case), the terminal device may display a currently shot image (referred to as a first target image) in the area in which the marquee is located on the display screen. Then, in response to another input (that is, a drag sub-input and a click sub-input, where i is 2 in this case) performed by the user on the marquee, the terminal device may display another shot image (referred to as a second target image) in the area in which the marquee is located on the display screen. Other cases can be deduced in the same manner. The terminal device may shoot and display the N target images on the display screen in response to the N inputs performed by the user on the marquee.

For example, as shown in FIG. 5, if the user drags the marquee 52 into the target area and clicks the marquee 52, the terminal device may update a display position of the marquee 52 to a target position in response to the drag sub-input and the click sub-input performed by the user, shoot a target image "1", and display the target image "1" in the target position. In this manner, the terminal device may update the display position of the marquee and sequentially shoot the N target images in response to the N inputs performed by the user on the preset marquee.

In this embodiment of the present disclosure, the display position of the marquee may be updated in response to the drag sub-input performed by the user, and a photo is shot and the currently shot photo is displayed in a position of the marquee in response to the click sub-input performed by the user, so that each shot photo can be displayed in each area on the display screen, and photo stitching can be performed in a shooting process, thereby improving efficiency of shooting and stitching photos by the terminal device.

Optionally, in this embodiment of the present disclosure, step 200 may be implemented through step 200a. Correspondingly, step 201 may be implemented through step 201a.

Step 200a: The terminal device receives an i-th input performed by the user on the preset marquee.

Step 201a: In response to the i-th input, the terminal device updates the marquee to an i-th position for display, shoots an i-th target image, and displays the i-th target image in the marquee.

The i-th position is a target position to which the marquee determined through the i-th input moves, and i is a positive integer less than or equal to N. The i-th target image is a preview image displayed on the shooting preview interface when the i-th input performed by the user is received.

For example, referring to FIG. 6, an example in which each of the N inputs is a drag input is used for description. In this case, an end position of the i-th input (that is, a target position to which the marquee moves) may be determined as the i-th position.

Figure 6A:
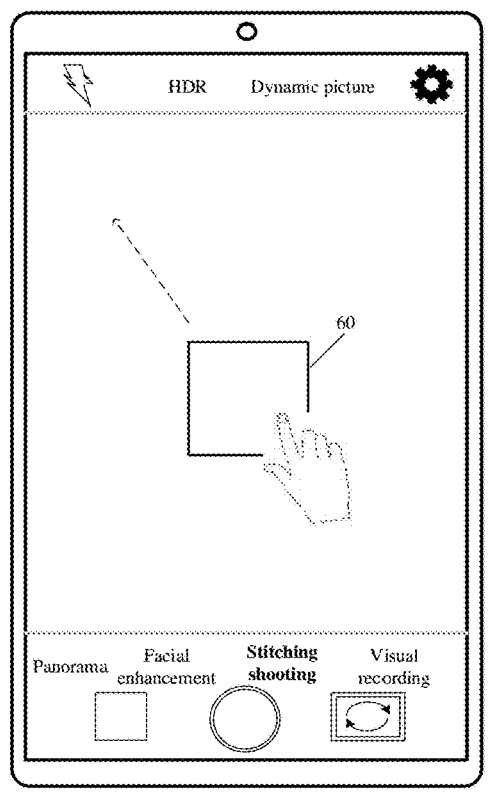
FIG. 6A is a schematic diagram 4 of an application interface of a shooting method according to an embodiment of the present disclosure.
Figure 6B:
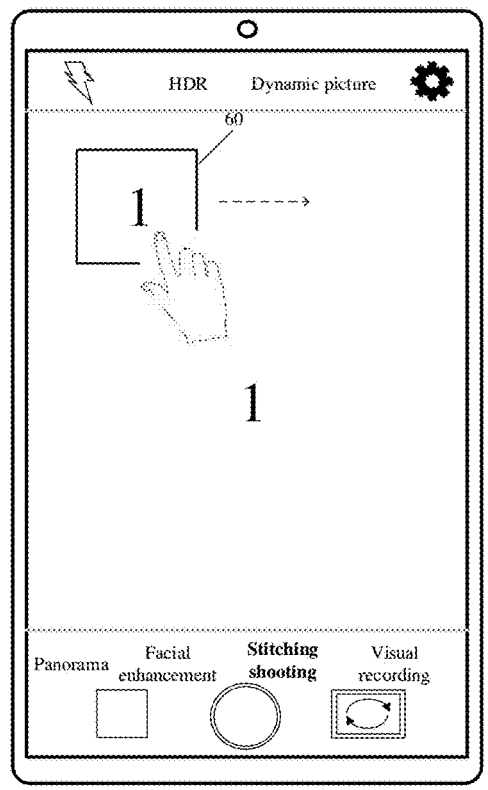
FIG. 6B is a schematic diagram 5 of an application interface of a shooting method according to an embodiment of the present disclosure.

First, if the user drags a marquee 60 from an initial position to a first position along an arrow direction shown in FIG. 6A (i is 1 in this case, and the i-th input is a first input), as shown in FIG. 6B, in response to the input, the terminal device may update the display position of the marquee 60 from the initial position to the first position, shoot a first target image "1", and display the first target image "1" at the first position.

Figure 6C:
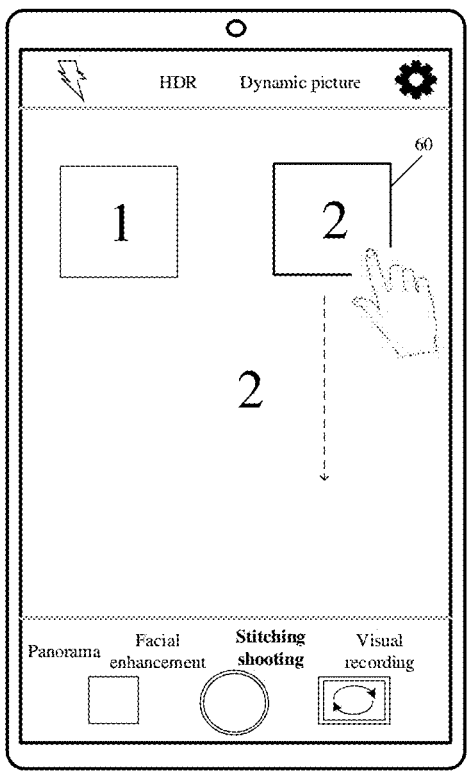
FIG. 6C is a schematic diagram 6 of an application interface of a shooting method according to an embodiment of the present disclosure.

Next, if the user drags the marquee from the first position to a second position along an arrow direction shown in FIG. 6C (i is 1 in this case, and the i-th input is a second input), as shown in FIG. 6C, in response to the input, the terminal device may update the display position of the marquee 60 from the first position to the second position, shoot a second target image "2", and display the second target image "2" at the second position. Other cases can be deduced in the same manner.

Figure 6D:
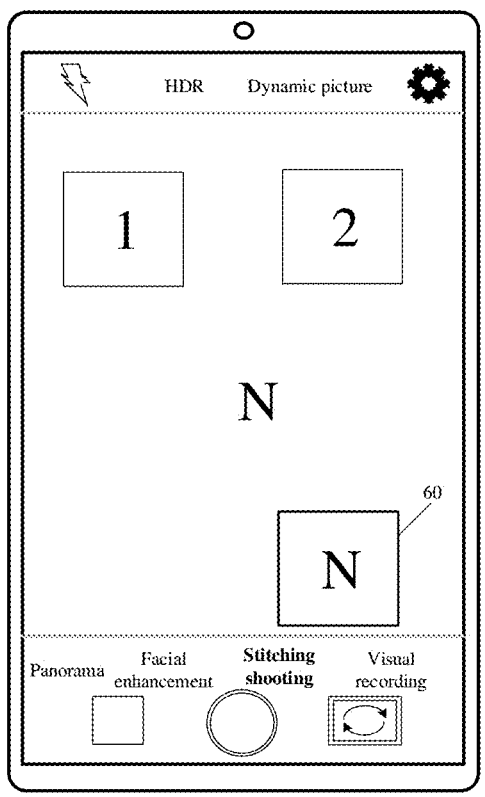
FIG. 6D is a schematic diagram 7 of an application interface of a shooting method according to an embodiment of the present disclosure.

Further, as shown in FIG. 6C and FIG. 6D, if the user drags the marquee from an (N−1)-th position to an N-th position (i is N in this case, and the i-th input is an N-th input), in response to the input, the terminal device may update the display position of the marquee from the (N−1)-th position to the N-th position, shoot an N-th target image "N", and display the N-th target image "N" at the N-th position.

In this manner, the terminal device may sequentially update the display position of the marquee and sequentially shoot the N target images in response to the N inputs performed by the user. In this embodiment of the present disclosure, thumbnails of a plurality of images may be separately displayed or arranged on a same display screen while shooting the plurality of images, so that image stitching can be performed on a plurality of target images on a current display screen, without a need to use photo processing software to splice photos obtained through shooting after the photos are shot. In this way, in this embodiment of the present disclosure, efficiency of shooting and stitching photos by the terminal device can be improved.

According to the shooting method provided in this embodiment of the present disclosure, N inputs performed by a user on a preset marquee may be received; and a display position of the marquee is updated and N target images are sequentially shot in response to the N inputs, where the target image is an image of a target area on a shooting preview interface, and the target area is a whole area of the shooting preview interface or an area selected by the marquee; and N is a positive integer. According to this solution, in this embodiment of the present disclosure, when a plurality of images are continuously shot, the plurality of images obtained through shooting may be sequentially displayed or arranged on a current display screen, so that image stitching can be further performed on the plurality of images obtained through shooting on a current display screen, without a need to use photo processing software to splice photos obtained through shooting after the photos are shot. In this way, in this embodiment of the present disclosure, efficiency of shooting and stitching photos by the terminal device can be improved.

In this embodiment of the present disclosure, the target image may be an image of a target area on the shooting preview interface, and the target area may be a whole area of the shooting preview interface or an area selected by the marquee. The following separately describes an implementation (the following implementation 1) of a whole area of the shooting preview interface and an implementation (the following implementation 2) of an area selected by the marquee on the shooting preview interface.

Implementation 1

In implementation 1, the target area may be a whole area of the shooting preview interface. In this case, the step of shooting an i-th target image and displaying the i-th target image in the marquee in step 201a may be implemented through step 201b-201d.

Step 201b: The terminal device shoots the i-th target image.

Step 201c: The terminal device scales the i-th target image to a target size, where the target size is a display size of the marquee.

Step 201d: The terminal device displays the i-th target image of the target size in the marquee.

In this embodiment of the present disclosure, in response to the i-th input performed by the user, the terminal device may use an image currently displayed in a whole area of the shooting preview interface as the i-th target image, scale the display size of the i-th target image in a specific proportion (for example, scale down) to match or be the same as the display size of the marquee, and then display the scaled i-th target image in the marquee.

Figure 7A:
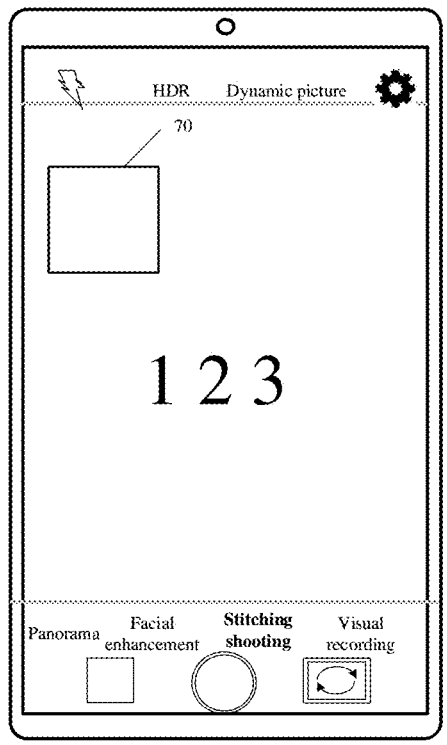
FIG. 7A is a schematic diagram 8 of an application interface of a shooting method according to an embodiment of the present disclosure.
Figure 7B:
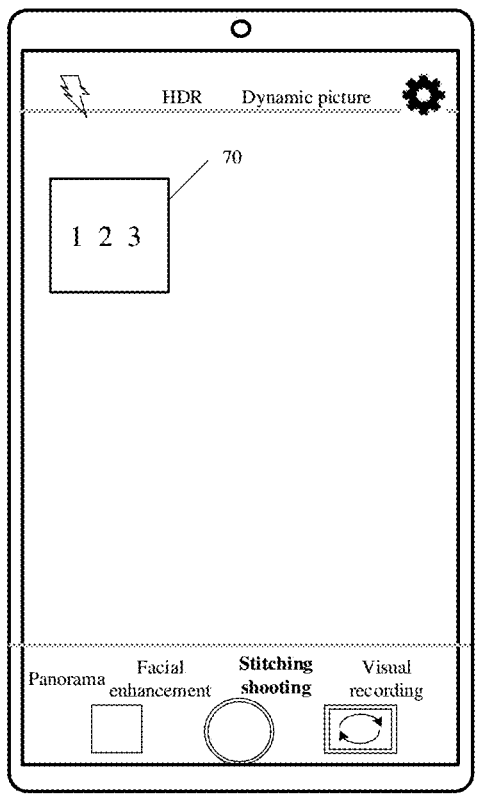
FIG. 7B is a schematic diagram 9 of an application interface of a shooting method according to an embodiment of the present disclosure.

For example, as shown in FIG. 7A, the terminal device may shoot an i-th target image "123" in response to an i-th input performed by the user, and scale down a display size of the i-th target image "123" in a specific proportion to be the same as a display size of a marquee 70, and then, as shown in FIG. 7B, displays the scaled i-th target image "123" in the marquee 70.

In this way, in this embodiment of the present disclosure, when a plurality of images are continuously shot, each image may be displayed or arranged on a current same display screen after being scaled, so that image stitching is further performed on the current display screen on a plurality of target images. In this way, in this embodiment of the present disclosure, efficiency of shooting and stitching photos by the terminal device can be improved.

Implementation 2

In implementation 2, the target area may be an area selected by the marquee on the shooting preview interface. In this case, the step of shooting an i-th target image and displaying the i-th target image in the marquee in step 201*a* may be implemented through step 201*e*-201*g*.

Step 201*e*: The terminal device shoots an image.

Step 201*f*: The terminal device selects an image that is in the image and that is in an area selected by the marquee as the i-th target image.

Step 201*g*: The terminal device displays the i-th target image in the marquee.

In this embodiment of the present disclosure, in response to the i-th input performed by the user, the terminal device may shoot an image currently displayed in a whole area of the shooting preview interface, select or determine an image that is in the image and that is in an area selected by the marquee as the i-th target image, and then display the i-th target image in the marquee.

Figure 8A:
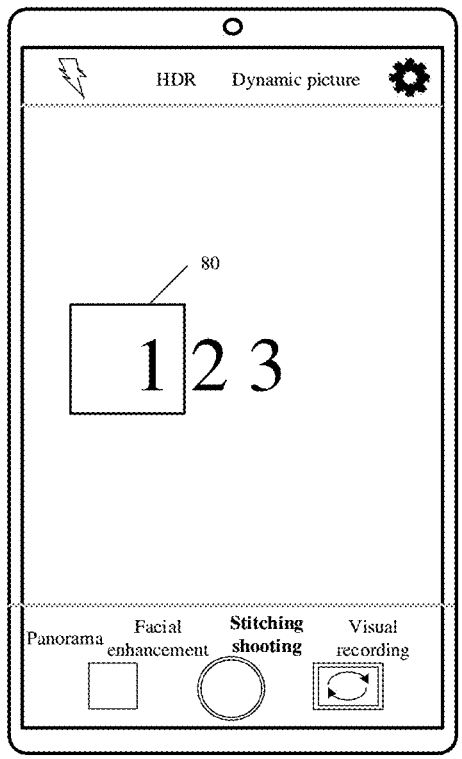
FIG. 8A is a schematic diagram 10 of an application interface of a shooting method according to an embodiment of the present disclosure.
Figure 8B:
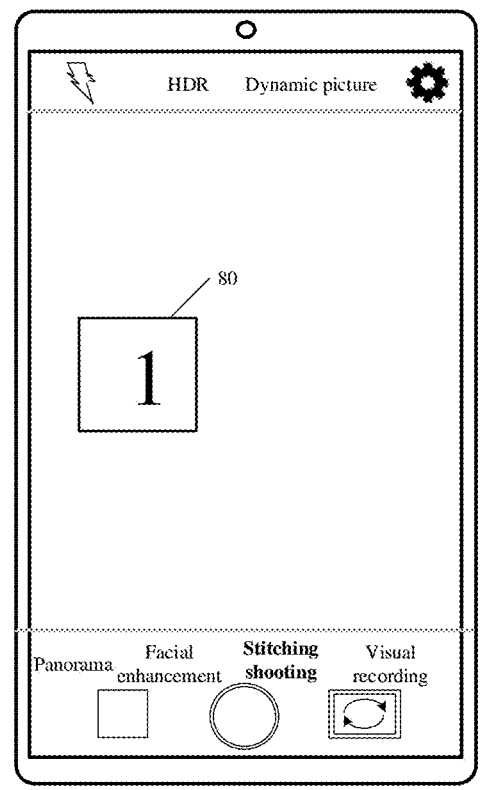
FIG. 8B is a schematic diagram 11 of an application interface of a shooting method according to an embodiment of the present disclosure.

For example, as shown in FIG. 8A, in response to the i-th input performed by the user, the terminal device may shoot an image "123" currently displayed in a whole area of the shooting preview interface, select or determine an image "1" that is in the image and that is selected by a marquee 80 as the i-th target image, and then as shown in FIG. 8B, display the i-th target image in the marquee 80.

According to the shooting method provided in this embodiment of the present disclosure, when a plurality of images are continuously shot, a part of the complete images may be selected as target images, so that the plurality of target images can be displayed or arranged on a same current display screen, and image stitching can be further performed on the plurality of target images on the current display screen. In this way, in this embodiment of the present disclosure, efficiency of shooting and stitching photos by the terminal device can be improved.

Optionally, in this embodiment of the present disclosure, assuming that the marquee and the shooting preview interface are displayed on a same screen of the terminal device, step 200 may be implemented through step 200*b*. Correspondingly, step 201 may be implemented through step 201*h*.

Step 200*b*: The terminal device receives a k-th input performed by the user on the preset marquee.

Step 201*h*: In response to the k-th input, the terminal device displays a (k−1)-th target image shot through a (k−1)-th input in a (k−1)-th area, updates the marquee to a k-th position for display, shoots a k-th target image, and displays the k-th target image in the marquee.

k is an integer greater than 1, the (k−1)-th area is an area corresponding to a first area, and the first area is a display area of the marquee at a target position to which the marquee determined through the (k−1)-th input moves.

In this embodiment of the present disclosure, for example, the user input is a drag input, and the first area may be an area corresponding to an end position of a (k−1)-th drag input.

According to the shooting method provided in this embodiment of the present disclosure, in response to receiving of each input performed by the user on the marquee, a previously shot target image may be fixedly displayed on a current display screen, the display position of the marquee is updated, a target image is shot again, and the target image is displayed on the current display screen. In this way, a plurality of target images can be continuously shot, and the plurality of target images are displayed or arranged on a current same display screen, so that image stitching is further performed on the plurality of target images on the current display screen. In this way, in this embodiment of the present disclosure, efficiency of shooting and stitching photos by the terminal device can be improved.

Optionally, in a possible implementation, the (k−1)-th area is an area that is on an interface on which the marquee is located and that is at a position corresponding to the first area. In this case, the marquee and the shooting preview interface are located on a same display screen, both the (k−1)-th area and the first area are areas on the same display screen, and positions of the (k−1)-th area and the first area overlap.

Optionally, in another possible implementation, in a case that the marquee is located on a first screen and the terminal device includes a second screen, the (k−1)-th area is an area that is on the second screen and that has a mapping relationship with the first area. In this case, both the marquee and the shooting preview interface are located on the second screen of the terminal device, the first area is an area on the second screen, the (k−1)-th area is an area on the first screen, that is, the (k−1)-th area and the first area are areas on different screens, and the (k−1)-th area and the first area have a mapping relationship (for example, a position mapping relationship).

According to the shooting method provided in this embodiment of the present disclosure, a display position of each target image may be sequentially determined when a plurality of target images are continuously shot, so that the plurality of target images are displayed or arranged at different positions on a current display screen, and image stitching is further performed on the plurality of target images on the current display screen. In this way, in this embodiment of the present disclosure, efficiency of shooting and stitching photos by the terminal device can be improved.

Figure 9:
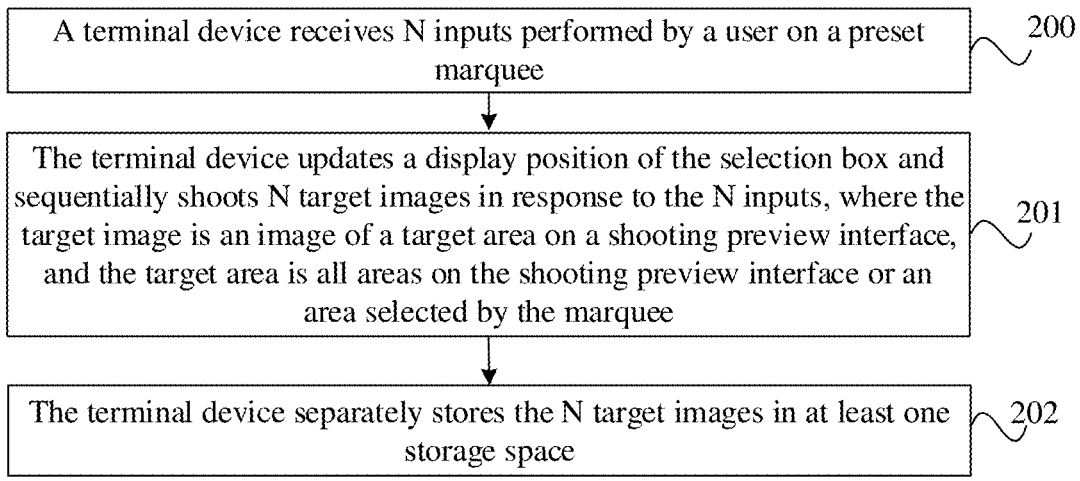
FIG. 9 is a schematic diagram 2 of a shooting method according to an embodiment of the present disclosure.

Optionally, with reference to FIG. 2, as shown in FIG. 9, after step 201, the shooting method provided in this embodiment of the present disclosure may further include the following step 202.

Step 202: The terminal device stores the N target images in at least one storage space.

Optionally, in this embodiment of the present disclosure, after shooting the N target images, the terminal device may separately store the N target images in a plurality of storage spaces. For example, the terminal device may store each of the N target images in an album. Optionally, this may be determined based on an actual use requirement, and is not limited in this embodiment of the present disclosure.

Optionally, in this embodiment of the present disclosure, after shooting the N target images, the terminal device may store the N target images in one storage space. For example, the terminal device may store the N target images in one album folder.

According to the shooting provided in this embodiment of the present disclosure, a plurality of images obtained through continuous shooting may be stored in an album, or a plurality of images obtained through continuous shooting may be stored in a same album folder, and the plurality of images are classified and stored for ease of viewing by the user, so that flexibility of storing an image by the terminal device after the image is shot is improved.

Figure 10:
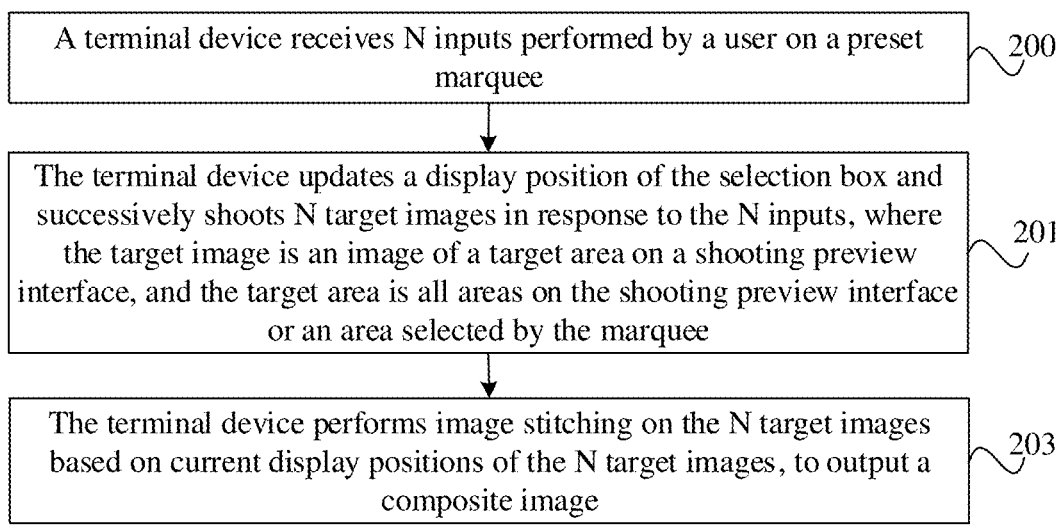
FIG. 10 is a schematic diagram 3 of a shooting method according to an embodiment of the present disclosure.

Optionally, with reference to FIG. 2, as shown in FIG. 10, after step 201, the shooting method provided in this embodiment of the present disclosure may further include the following step 203.

Step 203: The terminal device performs image stitching on the N target images based on current display positions of the N target images, to output a composite image.

Optionally, in a possible implementation, after the terminal device obtains the N target images, because the N target images are displayed at different positions in a current same display screen, the terminal device may perform image stitching on the N target images on the current display screen based on a relative layout of the N target images on the current display screen, to output the composite image.

Optionally, in another possible implementation, after the terminal device obtains the N target images, the N target images are currently displayed at different positions on a same display screen. If the user inputs at least one of the N target images to trigger updating or adjustment of a display position of the at least one target image, the terminal device may update or adjust the display position of the at least one target image in response to the input, to update a relative layout of the N target images, or perform image stitching on the N target images to output the composite image.

Optionally, in this embodiment of the present disclosure, the terminal device may automatically save the composite image, or may save the composite image in response to an input performed by the user (for example, an input on a save control). Optionally, the terminal device may automatically save the composite image after receiving preset duration of the input performed by the user. Alternatively, the terminal device may save the composite image in response to input performed by the user on the save control. Optionally, a triggering manner of saving the composite image may be determined based on an actual use requirement, and is not limited in this embodiment of the present disclosure.

Optionally, in this embodiment of the present disclosure, the terminal device may save the N target images obtained through shooting and the composite image obtained through stitching in a same album folder. That is, the terminal device may save, in a same album folder, the composite spliced image (the composite image) in the album and individual photos (the N target images) that are used to combine the spliced image.

Optionally, in this embodiment of the present disclosure, an identifier of the album folder may display the composite image obtained through stitching. When the user browses the album, the user may preview the composite image through the identifier of the folder. If the user clicks the identifier of the album folder to expand the folder, the terminal device may display the N target images obtained through shooting and the composite image obtained through stitching. In this way, the user may quickly view the spliced image and each individual photo in the album folder based on an actual use requirement, thereby improving user experience.

Optionally, in this embodiment of the present disclosure, after the images are spliced, the user may select a share function, and when sharing, the user may choose to separately share a picture (that is, a composite picture) that is obtained through stitching, or may share all individual pictures (the N target images) used for stitching the composite picture. Optionally, this may be determined based on an actual use requirement, and is not limited in this embodiment of the present disclosure.

Optionally, in this embodiment of the present disclosure, after the composite image is saved, the terminal device may upload (for example, share) the composite image to a network in response to the input performed by the user. The terminal device may separately share the composite spliced image in response to the input performed by the user, or share the composite spliced image and the individual photos that are used to combine the spliced image in the network.

In this embodiment of the present disclosure, photos may be spliced in a shooting process. In this way, photos can be shot and spliced conveniently and quickly; the user can view a photo stitching effect in real time, and the user can perform adjustment at any time to achieve a better photo stitching effect; and a fun in photo shooting can be enhanced.

Optionally, in this embodiment of the present disclosure, the N target images may be superposed and displayed on a background image. That is, the composite image may be a composite image of a target image and a background image (the foregoing at least one image) that are displayed on the display screen.

Optionally, in this embodiment of the present disclosure, the background image may be set by default by the terminal device, or may be customized by the user. For example, the user may perform an input on the display screen in a shooting process (for example, before or after shooting), and trigger the terminal device to display the background image on the display screen. Optionally, this may be determined based on an actual use requirement, and is not limited in this embodiment of the present disclosure.

According to the shooting method provided in this embodiment of the present disclosure, when a plurality of images are continuously shot, the plurality of images may be spliced on a current display screen based on a relative layout of the plurality of images on the current display screen, to output a composite image. In this embodiment of the present disclosure, thumbnails of a plurality of images may be separately displayed or arranged on a current same display screen while shooting the plurality of images, so that image stitching can be performed on a plurality of target images on a current display screen, without a need to use photo processing software to splice photos obtained through shooting after the photos are shot. In this way, in this embodiment of the present disclosure, efficiency of shooting and stitching photos by the terminal device can be improved.

The following separately uses implementation 3 and implementation 4 as an example to describe in detail a possible implementation in which the terminal device invokes the preset marquee.

Implementation 3

Figure 11:
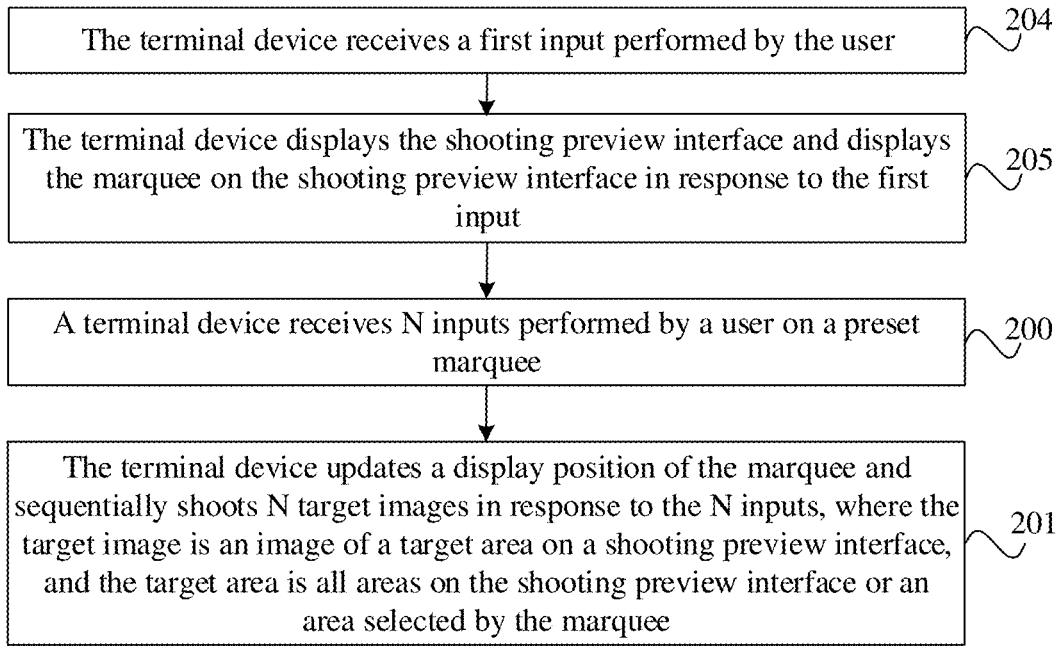
FIG. 11 is a schematic diagram 4 of a shooting method according to an embodiment of the present disclosure.

In implementation 3, with reference to FIG. 2, as shown in FIG. 11, before step 200, the shooting method provided in this embodiment of the present disclosure may further include the following step 204 and step 205.

Step 204: The terminal device receives a first input performed by the user.

The first input is used to trigger the terminal device to display the preset marquee.

Optionally, in this embodiment of the present disclosure, the terminal device may receive the first input performed by the user on a first control. The first control may be a stitching shoot control, or may be any other control used to trigger enabling of a stitching shoot function. Optionally, this may be determined based on an actual use requirement, and is not limited in this embodiment of the present disclosure. The user may perform an input on the stitching shoot control to trigger a camera of the terminal device to be in a stitching shoot mode, so that the terminal device can perform, in response to the input performed by the user, combination or stitching on images obtained through shooting in a shooting process.

Optionally, in this embodiment of the present disclosure, the first input performed by the user may be a click input (for example, a single-click input or a double-click input) or a slide input, or may be an input in any other possible form. Optionally, this may be determined based on an actual use requirement, and is not limited in this embodiment of the present disclosure.

Step 205: The terminal device displays the shooting preview interface and displays the marquee on the shooting preview interface in response to the first input.

In this embodiment of the present disclosure, the preset marquee and the shooting preview interface may be displayed on a same screen. Optionally, the terminal device may display, in response to the first input in a superposing or hovering manner, the preset marquee on the shooting preview interface displayed on the display screen. Further, the terminal device may update the display position of the marquee and sequentially shoot the N target images in response to the N inputs performed by the user on the preset marquee.

For example, referring back to FIG. 4, in a case that the terminal device runs the camera application, the user may click a "stitching shooting" mode (the first input) in a camera function option displayed on the display screen 40, or directly slide left or right to a "stitching shooting" mode (the first input). The terminal device may display the shooting preview interface 31 on the display screen 40 and display the marquee 42 on the shooting preview interface 41 in response to the first input.

In this embodiment of the present disclosure, the terminal device may display the marquee on the shooting preview interface. In this way, the user may perform an input on the marquee in a shooting process, to trigger the terminal device to update the display position of the marquee and shoot a photo, so that the currently shot photo can be displayed in an area in which the marquee is located. Therefore, in this embodiment of the present disclosure, currently shot photos may be spliced in a shooting process, without a need to use photo processing software to splice photos obtained through shooting after the photos are shot. In this way, in this embodiment of the present disclosure, efficiency of shooting and stitching photos by the terminal device can be improved.

Implementation 4

Figure 12:
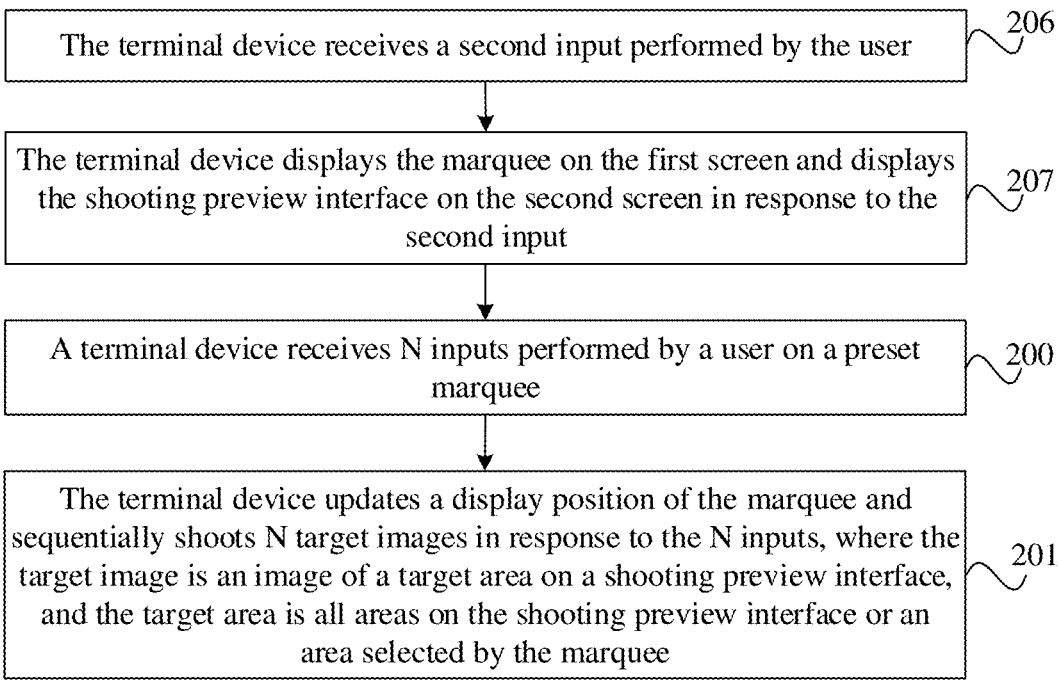
FIG. 12 is a schematic diagram 5 of a shooting method according to an embodiment of the present disclosure.

In implementation 4, it is assumed that the terminal device includes a first screen and a second screen. With reference to FIG. 2, as shown in FIG. 12, before step 200, the shooting method provided in this embodiment of the present disclosure may further include the following step 206 and step 207.

Step 206: The terminal device receives a second input performed by the user.

The second input is used to trigger the terminal device to display the preset marquee.

Optionally, in this embodiment of the present disclosure, the terminal device may receive the second input performed by the user on a second control. The second control may be a stitching shoot control, or may be any other control used to trigger enabling of a stitching shoot function. Optionally, this may be determined based on an actual use requirement, and is not limited in this embodiment of the present disclosure. The user may perform an input on the stitching shoot control to trigger a camera of the terminal device to be in a stitching shoot mode, so that the terminal device can perform, in response to the input performed by the user, combination or stitching on images obtained through shooting in a shooting process.

Optionally, in this embodiment of the present disclosure, the second input performed by the user may be a click input (for example, a single-click input or a double-click input) or a slide input, or may be an input in any other possible form. Optionally, this may be determined based on an actual use requirement, and is not limited in this embodiment of the present disclosure.

Step 207: The terminal device displays the marquee on the first screen and displays the shooting preview interface on the second screen in response to the second input.

In this embodiment of the present disclosure, the marquee and the shooting preview interface may be displayed on different screens. Optionally, the terminal device may display the marquee on the first screen and display the shooting preview interface on the second screen in response to the second input. Further, the terminal device may update the display position of the marquee and sequentially shoot the N target images in response to the N inputs performed by the user on the marquee.

For example, referring back to FIG. 5, in a case that a dual-screen terminal device runs a camera application and the shooting preview interface and a camera function interface are displayed on the first screen 50, the user may click a "stitching shooting" mode (the second input) in a function option on the camera function interface, or directly slide left or right to a "stitching shooting" mode (the second input). The terminal device may display the marquee 52 on the first screen 50 and display the shooting preview interface 53 on the second screen 52 in response to the second input.

In this embodiment of the present disclosure, the shooting preview interface and the marquee may be separately displayed on different screens of the terminal device, and therefore the marquee and the shooting preview interface do not interfere with each other in operation in a shooting process. For example, the marquee does not block an image displayed on the shooting preview interface, thereby facilitating a stitching shooting operation of the user, and improving efficiency of shooting and stitching photos by the terminal device.

Optionally, in this embodiment of the present disclosure, the shooting method provided in this embodiment of the present disclosure may further include the following step 208 and step 209.

Step 208: The terminal device receives a third input performed by the user on the marquee.

Optionally, in this embodiment of the present disclosure, the third input performed by the user may be a drag input or a click input (for example, a single-click input or a double-click input), or may be an input in any other possible form. Optionally, this may be determined based on an actual use requirement, and is not limited in this embodiment of the present disclosure.

Step 209: The terminal device updates display of the marquee in response to the third input.

In this embodiment of the present disclosure, the terminal device may update a display state of the marquee based on an actual use requirement of the user in a shooting process or after shooting is completed, to adjust a stitching effect, thereby improving an effect and efficiency of stitching photos in a shooting process.

Optionally, the updating display of the marquee (hereinafter referred to as a first action) may include any one of the following: updating a display position of the marquee, updating a display shape of the marquee, updating a display size of the marquee, updating a display angle of the marquee, displaying an image in the marquee through mirroring, and canceling display of an image in the marquee.

In this embodiment of the present disclosure, the terminal device may perform the first action corresponding to the third input in response to the third input. That is, if the third input is different, the first action is different. The following separately describes a possible implementation in which the terminal device performs the first action corresponding to the third input in response to the third input.

For example, the third input may be a drag input, and the first action corresponding to the third input may be updating the display position of the marquee. Optionally, the terminal device may update the display position of the marquee from a position A to a position B on the first screen in response to an input in which the user drags the marquee from the position A to the position B.

For another example, the third input may be a click input, and the first action corresponding to the third input may be that after display of the target image is canceled, the terminal device may cancel display of the target image in the marquee in response to the click input performed by the user on the marquee. In this way, if the user is not satisfied with a shot photo in a shooting process, after displaying the target image in the area in which the marquee is located, the user may trigger the terminal device to cancel display of the target image through the click input. In this way, the terminal device may adjust a stitching effect based on an actual use requirement of the user, so that an effect and efficiency of stitching photos in a shooting process can be improved.

For another example, the third input may include a touch and hold input and a click input, and the first action may be any one of the following: updating a display shape of the marquee, updating a display size of the marquee, updating a display angle of the marquee, displaying an image in the marquee through mirroring, and displaying an image on the shooting preview interface through mirroring. Optionally, the terminal device may display a plurality of the following controls in response to the touch and hold input performed by the user on the marquee: a shape update option, a size update option, an angle update option, a mirroring display option, and the like. Then, in response to a click input performed by the user on one of the plurality of options, the terminal device may perform an action corresponding to the option.

Figure 13:
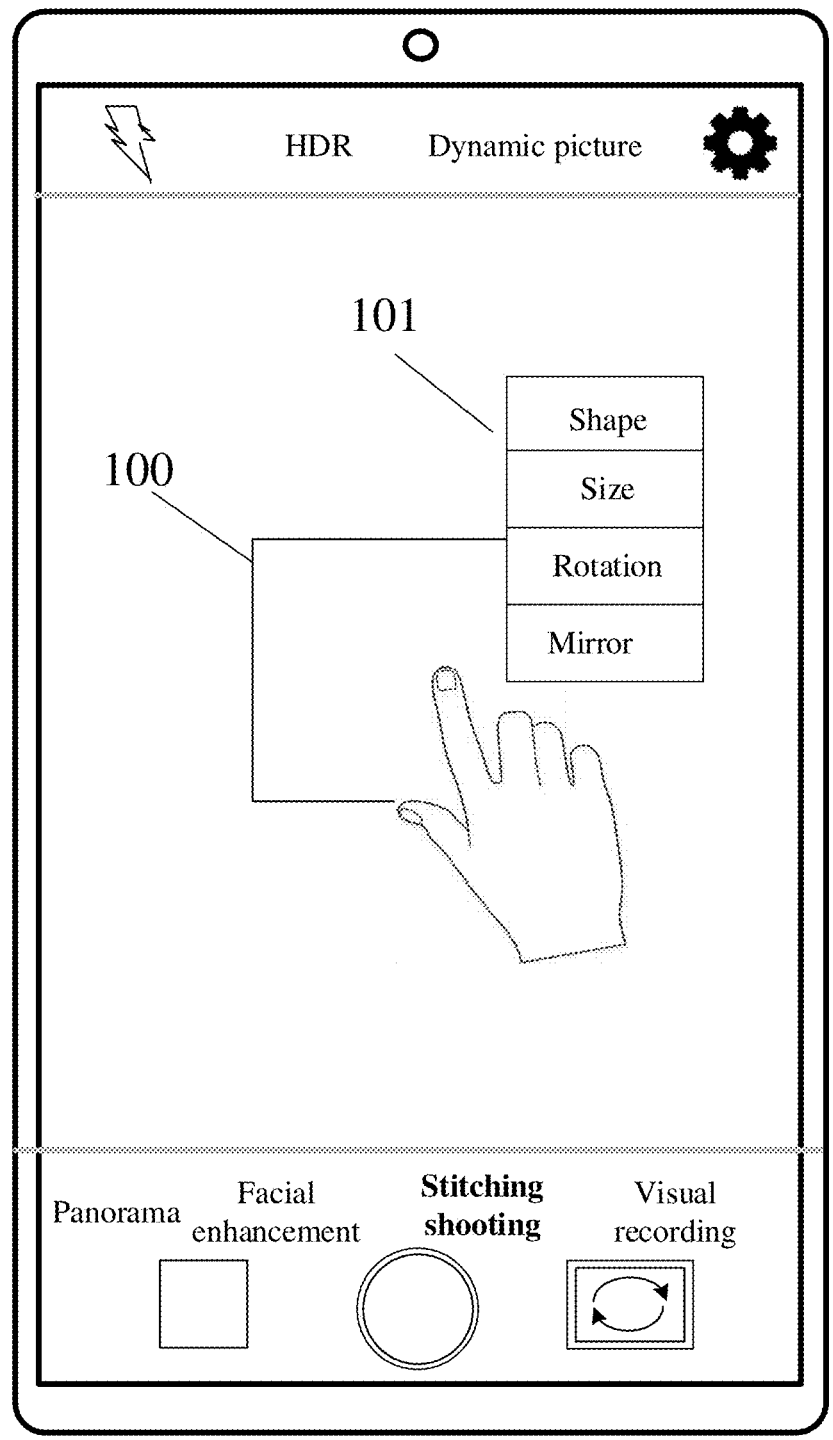
FIG. 13 is a schematic diagram 12 of an application interface of a shooting method according to an embodiment of the present disclosure.

As shown in FIG. 13, the user may touch and hold the marquee 100 to trigger the terminal device to display a menu list 101, where the menu list includes options such as "shape", "size", "rotation", and "mirror". If the user clicks the "shape" option, the user may select a shape from preset shapes, to trigger the terminal device to determine the display shape of the marquee and display the marquee of the shape. Certainly, the user may customize the shape of the marquee, that is, the user may draw a marquee of a specified shape. If the user clicks the "size" option, the user may select a size from preset size, to trigger the terminal device to update the display size of the marquee. If the user clicks the "rotation" option, the user may trigger, through an input (for example, a slide input), the terminal device to rotate the marquee clockwise or counterclockwise by an angle, and the terminal device may display a rotation angle value on the first screen in real time. If the user clicks the "mirror" option, the terminal device may be triggered to display an image in the marquee through mirroring and display an image on the shooting preview interface through mirroring.

In this embodiment of the present disclosure, the terminal device may update a shape, a size, or a rotation angle of the marquee, or may display a target image or a preview image through mirroring, or cancel display of the target image based on an actual use requirement of the user, to adjust a stitching effect, thereby improving an effect and efficiency of stitching photos in a shooting process.

Optionally, in this embodiment of the present disclosure, the shooting method provided in this embodiment of the present disclosure may further include the following step 210 and step 211.

Step 210: The terminal device receives a fourth input performed by the user.

The fourth input is used to trigger the terminal device to display an image stitching template.

Optionally, in this embodiment of the present disclosure, the terminal device receives the fourth input performed by the user on the second control. The second control may be an image stitching template selection control, or may be any other control used to trigger section of an image stitching template. Optionally, this may be determined based on an actual use requirement, and is not limited in this embodiment of the present disclosure. The user may perform an input on the image stitching template selection control, to trigger the terminal device to display an image stitching template on the first screen, so that the user performs shooting and image stitching with reference to the image stitching template in a shooting process.

Optionally, in this embodiment of the present disclosure, the fourth input performed by the user may be a click input (for example, a single-click input or a double-click input) or a touch and hold input, or may be an input in any other possible form. Optionally, this may be determined based on an actual use requirement, and is not limited in this embodiment of the present disclosure.

Step 211: The terminal device displays an image stitching template in response to the fourth input.

The image stitching template may include a background image and/or at least one image stitching box.

In this embodiment of the present disclosure, the terminal device may display a background on the first screen to the at least one image stitching box in response to the fourth input performed by the user, to trigger the terminal device to shoot images and combine or splice the images obtained through shooting.

Optionally, in this embodiment of the present disclosure, the image stitching template may be preset by a system by default, or may be customized by the user. This may be specifically determined based on an actual use requirement, and is not limited in this embodiment of the present disclosure.

Figure 14A:
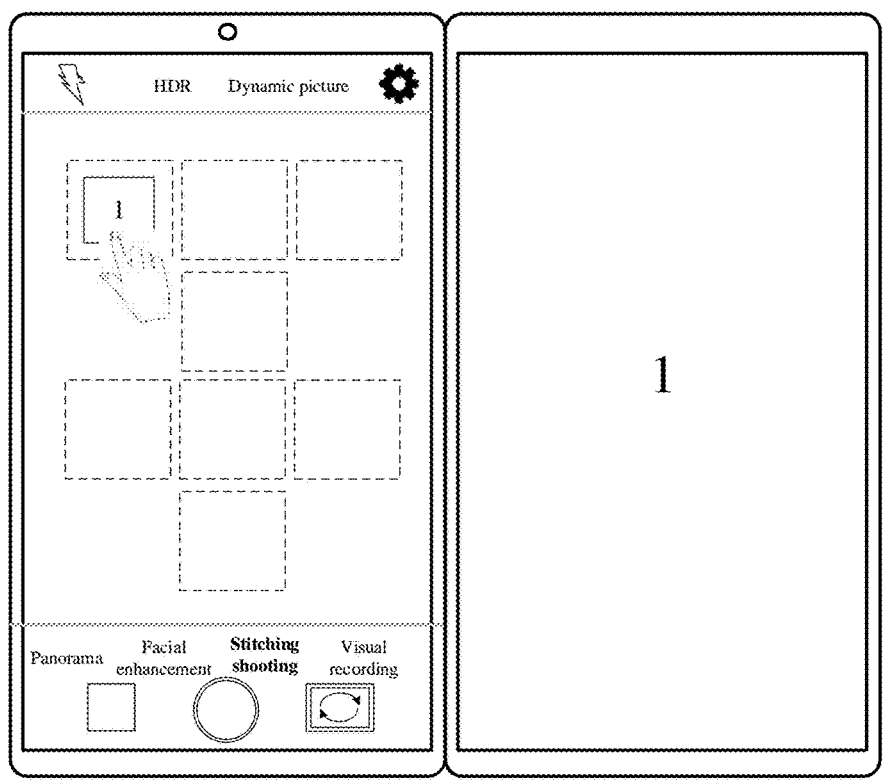
FIG. 14A is a schematic diagram 13 of an application interface of a shooting method according to an embodiment of the present disclosure.

For example, a dual-screen terminal device is used as an example for description. As shown in FIG. 14A, the terminal device may display a plurality of image stitching boxes (a dotted line part shown in FIG. 14) on the first screen. The user may move the marquee to the image stitching box based on an actual use requirement and with reference to the image stitching box, and combine or splice a plurality of images obtained through shooting.

Figure 14B:
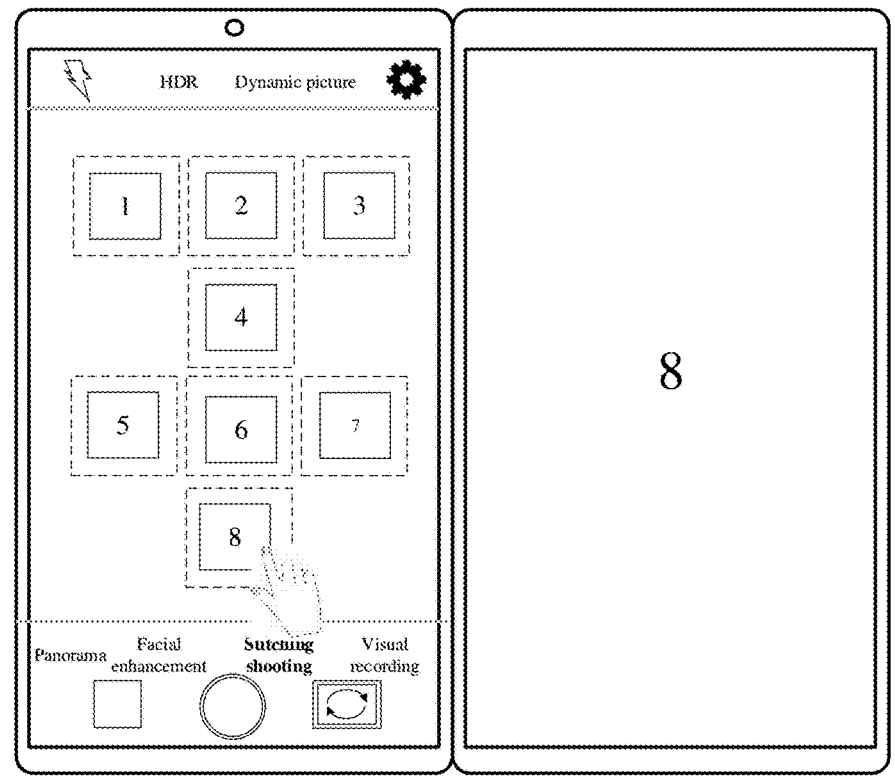
FIG. 14B is a schematic diagram 14 of an application interface of a shooting method according to an embodiment of the present disclosure.

As shown in FIG. 14A, after obtaining a target image "1", the terminal device may move the target image "1" to one of a plurality of image stitching boxes for display. As shown in FIG. 14B, the terminal device sequentially obtains N target images such as "2", "3", "4", "5", "6", "7", and "8", and sequentially moves the N target images to each of the plurality of image stitching boxes for display. Because the N target images are displayed at different positions on a current display screen, the terminal device may perform image stitching on the N target images on the current display screen based on a relative layout of the N target images on the current display screen, to output the composite image.

In this embodiment of the present disclosure, an image stitching template may be displayed in a shooting process, so that the user can combine or splice images obtained through shooting with reference to the image stitching template, thereby improving an image stitching effect obtained by the terminal device by combining images in a shooting process.

Figure 15:
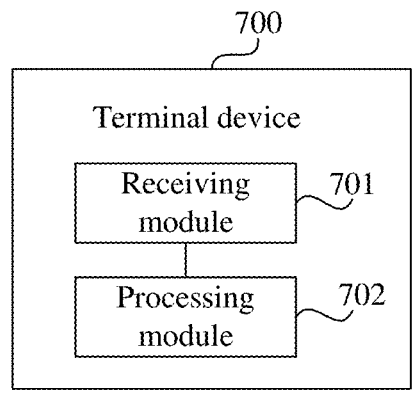
FIG. 15 is a schematic structural diagram 1 of a terminal device according to an embodiment of the present disclosure.

As shown in FIG. 15, an embodiment of the present disclosure provides a terminal device 700. The terminal device 700 may include a receiving module 701 and a processing module 702. The receiving module 701 is configured to receive N inputs performed by a user on a preset marquee. The processing module 702 is configured to update a display position of the marquee and sequentially shoot N target images in response to the N inputs received by the receiving module 701. The target image is an image of a target area on a shooting preview interface, and the target area is a whole area of the shooting preview interface or an area selected by the marquee; and N is a positive integer.

Optionally, in this embodiment of the present disclosure, the receiving module 701 may be configured to receive an i-th input performed by the user on the preset marquee. The processing module 702 may be configured to: in response to the i-th input received by the receiving module 701, update the marquee to an i-th position for display, shoot an i-th target image, and display the i-th target image in the marquee. The i-th position is a target position to which the marquee determined through the i-th input moves, and i is a positive integer less than or equal to N.

Optionally, in this embodiment of the present disclosure, the target area is a whole area of the shooting preview interface. The processing module 702 may be configured to shoot the i-th target image; scale the i-th target image to a target size, where the target size is a display size of the marquee; and display the i-th target image of the target size in the marquee.

Optionally, in this embodiment of the present disclosure, the target area is an area selected by the marquee on the shooting preview interface. The processing module 702 may be configured to shoot an image; select an image that is in the image and that is in an area selected by the marquee as the i-th target image; and display the i-th target image in the marquee.

Optionally, in this embodiment of the present disclosure, the marquee and the shooting preview interface are displayed on a same screen. The receiving module 701 is configured to receive a k-th input performed by the user on the preset marquee. The processing module 702 may be configured to: in response to the k-th input received by the receiving module 701, display a (k−1)-th target image shot through a (k−1)-th input in a (k−1)-th area, update the marquee to a k-th position for display, shoot a k-th target image, and display the k-th target image in the marquee, where k is an integer greater than 1, the (k−1)-th area is an area corresponding to a first area, and the first area is a display area of the marquee at a target position to which the marquee determined through the (k−1)-th input moves.

Optionally, in this embodiment of the present disclosure, the (k−1)-th area is an area that is on an interface on which the marquee is located and that is at a position corresponding to the first area; and/or in a case that the marquee is located on a first screen and the terminal device includes a second screen, the (k−1)-th area is an area that is on the second screen and that has a mapping relationship with the first area.

Figure 16:
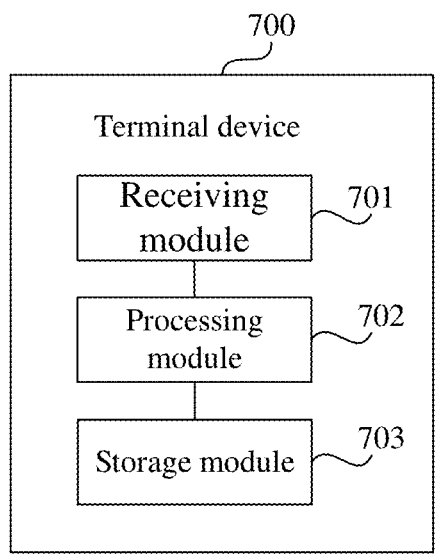
FIG. 16 is a schematic structural diagram 2 of a terminal device according to an embodiment of the present disclosure.

Optionally, with reference to FIG. 15, as shown in FIG. 16, the terminal device provided in this embodiment of the present disclosure may further include a storage module 703. The storage module 703 is configured to: after the processing module 702 updates the display position of the marquee and sequentially shoots the N target images in response to the N inputs, store the N target images in at least one storage space.

Optionally, in this embodiment of the present disclosure, after updating the display position of the marquee and sequentially shooting the N target images in response to the N inputs, the processing module 702 is further configured to perform image stitching on the N target images based on current display positions of the N target images, to output a composite image.

Optionally, in this embodiment of the present disclosure, the receiving module 701 is further configured to: before receiving the N inputs performed by the user on the preset marquee, receive a first input performed by the user. The processing module is 702 configured to display the shooting preview interface and display the marquee on the shooting preview interface in response to the first input received by the receiving module 701.

Optionally, in this embodiment of the present disclosure, the terminal device includes a first screen and a second screen. The receiving module 701 is further configured to: before receiving the N inputs performed by the user on the preset marquee, receive a second input performed by the user. The processing module 702 is further configured to display the marquee on the first screen and display the shooting preview interface on the second screen in response to the second input received by the receiving module 701.

Optionally, in this embodiment of the present disclosure, the receiving module 701 is further configured to receive a third input performed by the user on the marquee. The processing module 702 is further configured to update display of the marquee in response to the third input received by the receiving module 701.

Optionally, in this embodiment of the present disclosure, the processing module 702 may be configured to perform at least one of the following: updating a display position of the marquee; updating a display shape of the marquee; updating a display size of the marquee; updating a display angle of the marquee; displaying an image in the marquee through mirroring; or canceling display of an image in the marquee.

The terminal device provided in this embodiment of the present disclosure can implement the processes implemented by the terminal device in the foregoing method embodiment. To avoid repetition, details are not described herein again.

According to the terminal device provided in this embodiment of the present disclosure, N inputs performed by a user on a preset marquee may be received; and a display position of the marquee is updated and N target images are sequentially shot in response to the N inputs, where the target image is an image of a target area on a shooting preview interface, and the target area is a whole area of the shooting preview interface or an area selected by the marquee; and N is a positive integer. According to this solution, in this embodiment of the present disclosure, when a plurality of images are continuously shot, the plurality of images obtained through shooting may be sequentially displayed or arranged on a current display screen, so that image stitching can be further performed on the plurality of images obtained through shooting on a current display screen, without a need to use photo processing software to splice photos obtained through shooting after the photos are shot. In this way, in this embodiment of the present disclosure, efficiency of shooting and stitching photos by the terminal device can be improved.

Figure 17:
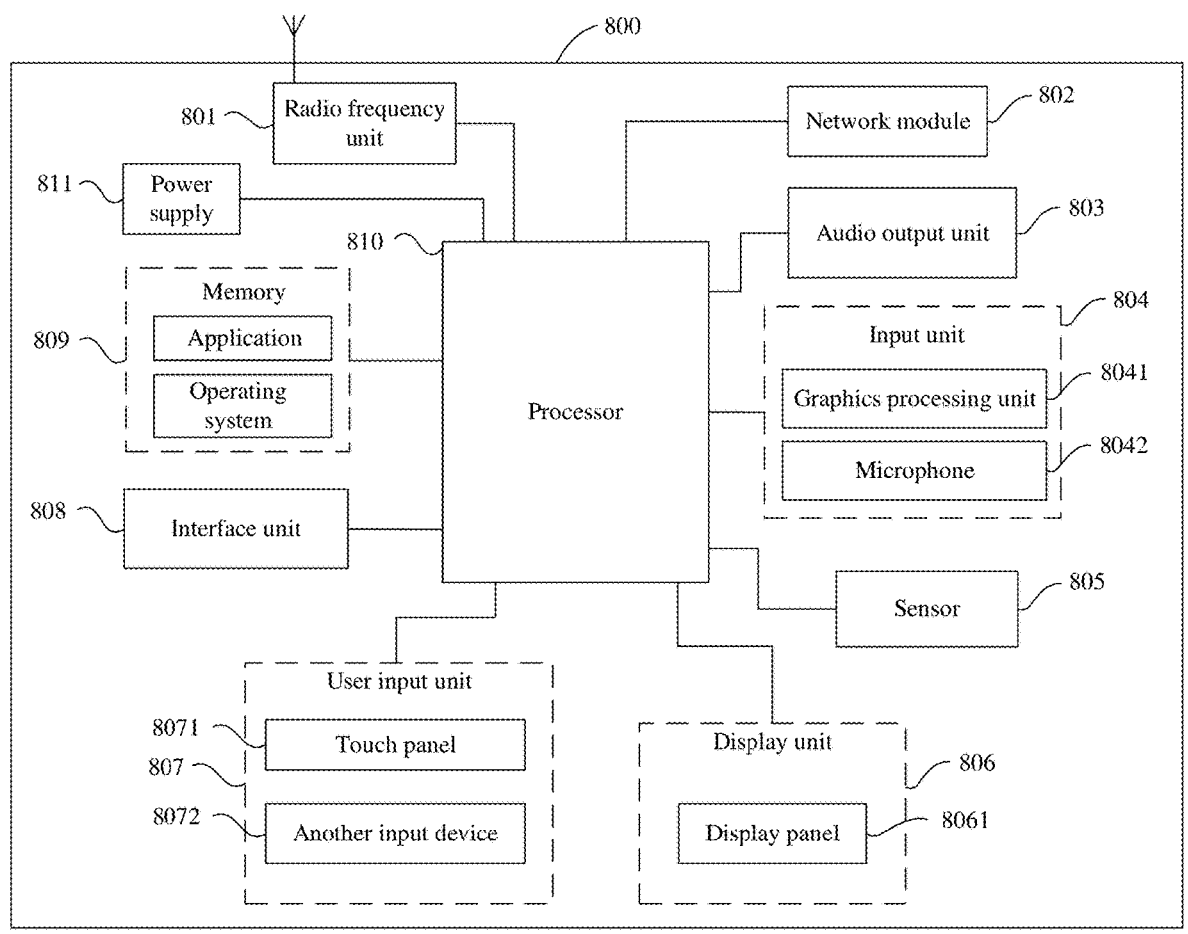
FIG. 17 is a schematic diagram of hardware of a terminal device according to an embodiment of the present disclosure.

FIG. 17 is a schematic diagram of a hardware structure of a terminal device according to embodiments of the present disclosure. As shown in FIG. 17, a terminal device 800 includes but is not limited to components such as a radio frequency unit 801, a network module 802, an audio output unit 803, an input unit 804, a sensor 805, a display unit 806, a user input unit 807, an interface unit 808, a memory 809, a processor 810, and a power supply 811. A person skilled in the art may understand that the structure of the terminal device shown in FIG. 17 does not constitute a limitation to the terminal device. The terminal device may include more or fewer components than that shown in the figure, or a combination of some components, or an arrangement of different components. In this embodiment of the present disclosure, the terminal device includes but is not limited to a mobile phone, a tablet computer, a notebook computer, a palmtop computer, a vehicle-mounted terminal, a wearable device, a pedometer, or the like.

The user input unit 807 is configured to receive N inputs performed by a user on a preset marquee; and the processor 810 is configured to update a display position of the marquee and sequentially shoot N target images in response to the N inputs received by the user input unit 807, where the target image is an image of a target area on a shooting preview interface, and the target area is a whole area of the shooting preview interface or an area selected by the marquee; and N is a positive integer.

An embodiment of the present disclosure provides a terminal device. The terminal device may receive N inputs performed by a user on a preset marquee; and update a display position of the marquee and sequentially shoot N target images in response to the N inputs, where the target image is an image of a target area on a shooting preview interface, and the target area is a whole area of the shooting preview interface or an area selected by the marquee; and N is a positive integer. According to this solution, in this embodiment of the present disclosure, when a plurality of images are continuously shot, the plurality of images obtained through shooting may be sequentially displayed or arranged on a current display screen, so that image stitching can be further performed on the plurality of images obtained through shooting on a current display screen, without a need to use photo processing software to splice photos obtained through shooting after the photos are shot. In this way, in this embodiment of the present disclosure, efficiency of shooting and stitching photos by the terminal device can be improved.

It should be understood that, in this embodiment of the present disclosure, the radio frequency unit 801 may be configured to receive and send information or a signal in a call process. For example, after receiving downlink data from a base station, the radio frequency unit 801 sends the downlink data to the processor 810 for processing. In addition, the radio frequency unit 801 sends uplink data to the base station. Generally, the radio frequency unit 801 includes but is not limited to an antenna, at least one amplifier, a transceiver, a coupler, a low noise amplifier, a duplexer, and the like. In addition, the radio frequency unit 801 may also communicate with another device through a wireless communications system and network.

The terminal device 800 provides wireless broadband Internet access for the user by using the network module 802, for example, helping the user to send and receive an e-mail, browse a web page, and access streaming media.

The audio output unit 803 may convert audio data received by the radio frequency unit 801 or the network module 802 or stored in the memory 809 into an audio signal and output the audio signal as a sound. In addition, the audio output unit 803 may further provide an audio output (for example, a call signal received voice, or a message received voice) related to a specific function implemented by the terminal device 800. The audio output unit 803 includes a speaker, a buzzer, a telephone receiver, and the like.

The input unit 804 is configured to receive an audio signal or a video signal. The input unit 804 may include a graphics processing unit (GPU) 8041 and a microphone 8042, and the graphics processing unit 8041 processes image data of a still picture or video obtained by an image capture apparatus (such as a camera) in a video capture mode or an image capture mode. A processed image frame may be displayed on the display unit 806. The image frame processed by the graphics processing unit 8041 may be stored in the memory 809 (or another storage medium) or sent by using the radio frequency unit 801 or the network module 802. The microphone 8042 may receive a sound and can process such sound into audio data. Processed audio data may be converted, in a call mode, into a format that can be sent to a mobile communication base station by using the radio frequency unit 801 for output.

The terminal device 800 further includes at least one sensor 805, for example, an optical sensor, a motion sensor, and other sensors. The optical sensor includes an ambient light sensor and a proximity sensor. The ambient light sensor may adjust luminance of the display panel 8061 based on brightness of ambient light. The proximity sensor may turn off the display panel 8061 and/or backlight when the terminal device 800 approaches an ear. As a motion sensor, an accelerometer sensor may detect magnitude of acceleration in various directions (usually three axes), may detect magnitude and the direction of gravity when stationary, may be configured to identify postures of the terminal device (such as horizontal and vertical screen switch, related games, and magnetometer posture calibration), may perform functions related to vibration identification (such as a pedometer and a knock), and the like. The sensor 805 may further include a fingerprint sensor, a pressure sensor, an iris sensor, a molecular sensor, a gyroscope, a barometer, a hygrometer, a thermometer, an infrared sensor, or the like. Details are not described herein.

The display unit 806 is configured to display information input by the user or information provided to the user. The display unit 806 may configure the display panel 8061 in a form such as a light-emitting diode (OLED).

The user input unit 807 may be configured to receive input digit or character information, and generate a key signal input related to a user setting and function control of the terminal device. The user input unit 807 includes a touch panel 8071 and another input device 8072. The touch panel 8071, also called a touch screen, may collect a touch operation of the user on or near the touch panel 8071 (for example, an operation performed by the user with any suitable object or accessory such as a finger or a stylus on or near the touch panel 8071). The touch panel 8071 may include two parts: a touch detection apparatus and a touch controller. The touch detection apparatus detects a touch position of the user, detects a signal brought by the touch operation, and sends the signal to the touch controller. The touch controller receives touch information from the touch detection apparatus, converts the touch information into touch point coordinates, sends the touch point coordinates to the processor 810, and receives and executes a command sent by the processor 810. In addition, the touch panel 8071 may be implemented by using a plurality of types such as a resistive type, a capacitive type, an infrared ray, and a surface acoustic wave. In addition to the touch panel 8071, the user input unit 807 may further include the another input device 8072. The another input device 8072 may include but is not limited to a physical keyboard, a function key (such as a volume control key or a power on/off key), a trackball, a mouse, a joystick, and the like. Details are not described herein.

Further, the touch panel 8071 may cover the display panel 8061. When detecting the touch operation on or near the touch panel 8071, the touch panel 8071 transmits the touch operation to the processor 810 to determine a type of a touch event, and then the processor 810 provides corresponding visual output on the display panel 8061 based on the type of the touch event. Although in FIG. 17, the touch panel 8071 and the display panel 8061 are configured as two independent components to implement input and output functions of the terminal device, in some embodiments, the touch panel 8071 and the display panel 8061 can be integrated to implement the input and output functions of the terminal device. Details are not limited herein.

The interface unit 808 is an interface for connecting an external apparatus to the terminal device 800. For example, the external apparatus may include a wired or wireless headphone port, an external power supply (or a battery charger) port, a wired or wireless data port, a storage card port, a port used to connect to an apparatus having an identity module, an audio input/output (I/O) port, a video I/O port, a headset port, and the like. The interface unit 808 may be configured to receive input (for example, data information and power) from an external apparatus and transmit the received input to one or more elements in the terminal device 800 or may be configured to transmit data between the terminal device 800 and an external apparatus.

The memory 809 may be configured to store a software program and various data. The memory 809 may mainly include a program storage area and a data storage area. The program storage area may store an operating system, an application required by at least one function (such as a sound play function or an image play function), and the like. The data storage area may store data (such as audio data or an address book) created based on use of the mobile phone, and the like. In addition, the memory 809 may include a high-speed random access memory, and may further include a non-volatile memory such as at least one magnetic disk storage component, a flash memory component, or another volatile solid-state storage component.

The processor 810 is a control center of the terminal device, connects various parts of the entire terminal device by using various interfaces and circuits, and performs various functions of the terminal device and processes data by running or executing the software programs and/or the modules stored in the memory 809 and invoking data stored in the memory 809, so as to monitor the terminal device as a whole. The processor 810 may include one or more processing units. Optionally, the processor 810 may integrate an application processor and a modem processor. The application processor mainly deals with an operating system, a user interface, and an application. The modem processor mainly deals with wireless communication. It may be understood that, alternatively, the modem processor may not be integrated into the processor 810.

The terminal device 800 may further include the power supply 811 (such as a battery) supplying power to each component. Preferably, the power supply 811 may be logically connected to the processor 810 by using a power management system, so as to implement functions such as charging management, discharging management and power consumption management by using the power management system.

Optionally, an embodiment of the present disclosure further provides a terminal device, including the processor 810 and the memory 809 shown in FIG. 17, and a computer program that is stored in the memory 809 and executable on the processor 810. When the processor 810 executes the computer program, the foregoing processes of the shooting method embodiment are implemented and a same technical effect can be achieved. To avoid repetition, details are not described herein again.

An embodiment of the present disclosure further provides a non-transitory computer-readable storage medium. The non-transitory computer-readable storage medium stores a computer program, and when the computer program is executed by a processor, the foregoing processes of the shooting method embodiment are implemented and a same technical effect can be achieved. To avoid repetition, details are not described herein again. The non-transitory computer-readable storage medium may include a read-only memory (ROM), a random access memory (RAM), a magnetic disk, an optical disc, or the like.

It should be noted that in this specification, the terms "comprise", "include" and any other variants thereof are intended to cover non-exclusive inclusion, so that a process, a method, an article, or an device that includes a series of elements not only includes these very elements, but may also include other elements not expressly listed, or also include elements inherent to this process, method, article, or device. An element limited by "includes a . . . " does not, without more constraints, preclude the presence of additional identical elements in the process, method, article, or apparatus that includes the element.

Based on the descriptions of the foregoing implementations, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of the present disclosure essentially or the part contributing to the prior art may be implemented in a form of a software product. The computer software product is stored in a storage medium (such as a ROM/RAM, a hard disk, or an optical disc), and includes several instructions for instructing a terminal device (which may be a mobile phone, a computer, a server, an air conditioner, a network device, or the like) to perform the methods disclosed in the embodiments of the present disclosure.

The embodiments of the present disclosure are described above with reference to the accompanying drawings, but the present disclosure is not limited to the above specific implementations, and the above specific implementations are only illustrative and not restrictive. Under the enlightenment of the present disclosure, those of ordinary skill in the art can make many forms without departing from the purpose of the present disclosure and the protection scope of the claims, all of which fall within the protection of the present disclosure.

What is claimed is:

1. A shooting method, applied to a terminal device, wherein the method comprises the following steps:
receiving N inputs performed by a user on a preset marquee; and
updating the marquee to an i-th position for display, shooting an i-th target image, and displaying the i-th target image in the marquee in response to an i-th input of the N inputs, wherein
the target image is an image of a target area on a shooting preview interface, and the target area is a whole area of the shooting preview interface or an area selected by the marquee, and the i-th position is a target position to which the marquee determined through i-th input moves; and N is a positive integer, and i is a positive integer less than or equal to N.

2. The method according to claim 1, wherein the target area is a whole area of the shooting preview interface; and
the step of shooting the i-th target image, and displaying the i-th target image in the marquee comprises the following steps:
shooting the i-th target image;
scaling the i-th target image to a target size, wherein the target size is a display size of the marquee; and
displaying the i-th target image of the target size in the marquee.

3. The method according to claim 1, wherein the target area is an area selected by the marquee on the shooting preview interface; and
the step of shooting the i-th target image, and displaying the i-th target image in the marquee comprises the following steps:
shooting an image;
selecting an image that is in the image and that is in an area selected by the marquee as the i-th target image; and
displaying the i-th target image in the marquee.

4. The method according to claim 1, wherein the marquee and the shooting preview interface are displayed on a same screen; and
the step of receiving N inputs performed by the user on the preset marquee comprises the following step:
receiving a k-th input performed by the user on the preset marquee; and
the step of updating the display position of the marquee and sequentially shooting N target images in response to the N inputs comprises the following steps:
displaying a (k−1)-th target image shot through a (k−1)-th input in a (k−1)-th area, updating the marquee to a k-th position for display, shooting a k-th target image, and displaying the k-th target image in the marquee in response to the k-th input, wherein
k is an integer greater than 1, the (k−1)-th area is an area corresponding to a first area, and the first area is a display area of the marquee at a target position to which the marquee determined through the (k−1)-th input moves.

5. The method according to claim 4, wherein further comprises at least one of:
the (k−1)-th area is an area that is on an interface on which the marquee is located and that is at a position corresponding to the first area; or
in a case that the marquee is located on a first screen and the terminal device comprises a second screen, the (k−1)-th area is an area that is on the second screen and that has a mapping relationship with the first area.

6. The method according to claim 1, wherein after the updating the display position of the marquee and sequentially shooting N target images in response to the N inputs, the method further comprises the following step:
storing the N target images in at least one storage space.

7. The method according to claim 1, wherein after the updating the display position of the marquee and sequentially shooting N target images in response to the N inputs, the method further comprises the following step:
performing image stitching on the N target images based on current display positions of the N target images, to output a composite image.

8. The method according to claim 1, wherein before the receiving N inputs performed by the user on the preset marquee, the method further comprises the following steps:
receiving a first input performed by the user; and
displaying the shooting preview interface and displaying the marquee on the shooting preview interface in response to the first input.

9. The method according to claim 1, wherein the terminal device comprises a first screen and a second screen; and
before the receiving N inputs performed by the user on the preset marquee, the method further comprises the following steps:
receiving a second input performed by the user; and
displaying the marquee on the first screen and displaying the shooting preview interface on the second screen in response to the second input.

10. The method according to claim 1, wherein the method further comprises the following steps:
receiving a third input performed by the user on the marquee; and
updating display of the marquee in response to the third input.

11. The method according to claim 10, wherein the updating display of the marquee comprises any one of:
updating a display position of the marquee;
updating a display shape of the marquee;
updating a display size of the marquee;
updating a display angle of the marquee;
displaying an image in the marquee through mirroring; and
canceling display of an image in the marquee.

12. A terminal device, comprising a processor, a memory, and a computer program that is stored in the memory and executable on the processor, wherein the computer program, when executed by the processor, causes the terminal device to perform the following steps:
receiving N inputs performed by a user on a preset marquee; and
updating the marquee to an i-th position for display, shooting an i-th target image, and displaying the i-th target image in the marquee in response to an i-th input of the N inputs, wherein
the target image is an image of a target area on a shooting preview interface, and the target area is a whole area of the shooting preview interface or an area selected by the marquee, and the i-th position is a target position to which the marquee determined through i-th input moves; and N is a positive integer, and i is a positive integer less than or equal to N.

13. The terminal device according to claim 12, wherein the target area is a whole area of the shooting preview interface; and
the computer program, when executed by the processor, causes the terminal device to perform following steps:
shooting the i-th target image;
scaling the i-th target image to a target size, wherein the target size is a display size of the marquee; and
displaying the i-th target image of the target size in the marquee.

14. The terminal device according to claim 12, wherein the target area is an area selected by the marquee on the shooting preview interface; and
the computer program, when executed by the processor, causes the terminal device to perform the following steps:

shooting an image;

selecting an image that is in the image and that is in an area selected by the marquee as the i-th target image; and displaying the i-th target image in the marquee.

15. The terminal device according to claim 12, wherein the marquee and the shooting preview interface are displayed on a same screen; and the computer program, when executed by the processor, causes the terminal device to perform the following steps:

receiving a k-th input performed by the user on the preset marquee; and displaying a (k−1)-th target image shot through a (k−1)-th input in a (k−1)-th area, updating the marquee to a k-th position for display, shooting a k-th target image, and displaying the k-th target image in the marquee in response to the k-th input, wherein k is an integer greater than 1, the (k−1)-th area is an area corresponding to a first area, and the first area is a display area of the marquee at a target position to which the marquee determined through the (k−1)-th input moves.

16. The terminal device according to claim 12, wherein the computer program, when executed by the processor, causes the terminal device to further perform the following steps:

receiving a first input performed by the user; and displaying the shooting preview interface and displaying the marquee on the shooting preview interface in response to the first input.

17. The terminal device according to claim 12, wherein the terminal device comprises a first screen and a second screen; and The computer program, when executed by the processor, causes the terminal device to further perform the following steps:

receiving a second input performed by the user; and displaying the marquee on the first screen and displaying the shooting preview interface on the second screen in response to the second input.

18. A non-transitory computer-readable storage medium, wherein the non-transitory computer-readable storage medium stores a computer program, and the computer program, when executed by a processor, causes the processor to perform the following steps:

receiving N inputs performed by a user on a preset marquee; and updating the marquee to an i-th position for display, shooting an i-th target image, and displaying the i-th target image in the marquee in response to an i-th input of the N inputs, wherein the target image is an image of a target area on a shooting preview interface, and the target area is a whole area of the shooting preview interface or an area selected by the marquee, and the i-th position is a target position to which the marquee determined through i-th input moves; and N is a positive integer, and i is a positive integer less than or equal to N.

* * * * *